United States Patent
Takeda et al.

(10) Patent No.: US 10,576,971 B2
(45) Date of Patent: Mar. 3, 2020

(54) PUSH CART AND METHOD FOR CONTROLLING PUSH CART

(71) Applicant: MAKITA CORPORATION, Anjo-shi, Aichi (JP)

(72) Inventors: Kouichi Takeda, Anjo (JP); Itsuku Kato, Anjo (JP); Jiro Suzuki, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 16/024,272

(22) Filed: Jun. 29, 2018

(65) Prior Publication Data

US 2019/0023265 A1  Jan. 24, 2019

(30) Foreign Application Priority Data

Jul. 18, 2017  (JP) .................................. 2017-139180

(51) Int. Cl.

| | |
|---|---|
| *B60W 30/09* | (2012.01) |
| *B62B 5/00* | (2006.01) |
| *B60L 15/20* | (2006.01) |
| *B60W 10/18* | (2012.01) |
| *B60W 10/08* | (2006.01) |
| *B60W 50/14* | (2020.01) |
| *B62B 3/12* | (2006.01) |

(52) U.S. Cl.
CPC ......... *B60W 30/09* (2013.01); *B60L 15/2009* (2013.01); *B60W 10/08* (2013.01); *B60W 10/18* (2013.01); *B60W 50/14* (2013.01); *B62B 5/0033* (2013.01); *B60L 2200/30* (2013.01); *B60L 2240/12* (2013.01); *B60L 2240/421* (2013.01); *B60W 2300/40* (2013.01); *B60W 2550/10* (2013.01); *B60W 2710/08* (2013.01); *B60W 2710/18* (2013.01); *B62B 3/12* (2013.01)

(58) Field of Classification Search
None
See application file for complete search history.

(56) References Cited

U.S. PATENT DOCUMENTS

| | | | |
|---|---|---|---|
| 2007/0132563 A1* | 6/2007 | Balbale ................. | B60Q 9/004 340/435 |
| 2009/0085791 A1* | 4/2009 | Ruby ..................... | G01S 7/021 342/20 |
| 2014/0156157 A1* | 6/2014 | Johnson ................. | B60T 7/22 701/70 |

(Continued)

FOREIGN PATENT DOCUMENTS

JP   2014-166117 A   9/2014

*Primary Examiner* — Genna M Mott
*Assistant Examiner* — Melanie J Patrick
(74) *Attorney, Agent, or Firm* — Oliff PLC

(57) ABSTRACT

A push cart includes a wheel, a motor, an obstacle detector, and a controller. The motor is configured to generate a rotational force that rotates the wheel. The obstacle detector is configured to detect an obstacle. The controller is configured to execute, in response to detection of the obstacle by the obstacle detector, avoidance control to control driving of the motor such that a movement of the push cart is limited. The controller is configured to disable execution of the avoidance control in response to a determination that a specified disabling condition is satisfied.

16 Claims, 17 Drawing Sheets

(56) References Cited

U.S. PATENT DOCUMENTS

| | | | | |
|---|---|---|---|---|
| 2016/0107642 A1* | 4/2016 | Salgado | ................ | B60W 50/10 |
| | | | | 701/1 |
| 2016/0196612 A1* | 7/2016 | Hagelstein | ............. | G06Q 40/08 |
| | | | | 705/4 |
| 2016/0287465 A1* | 10/2016 | Rabin | ..................... | B60L 15/30 |
| 2017/0129523 A1* | 5/2017 | Hane | ........................ | A61H 3/04 |

* cited by examiner

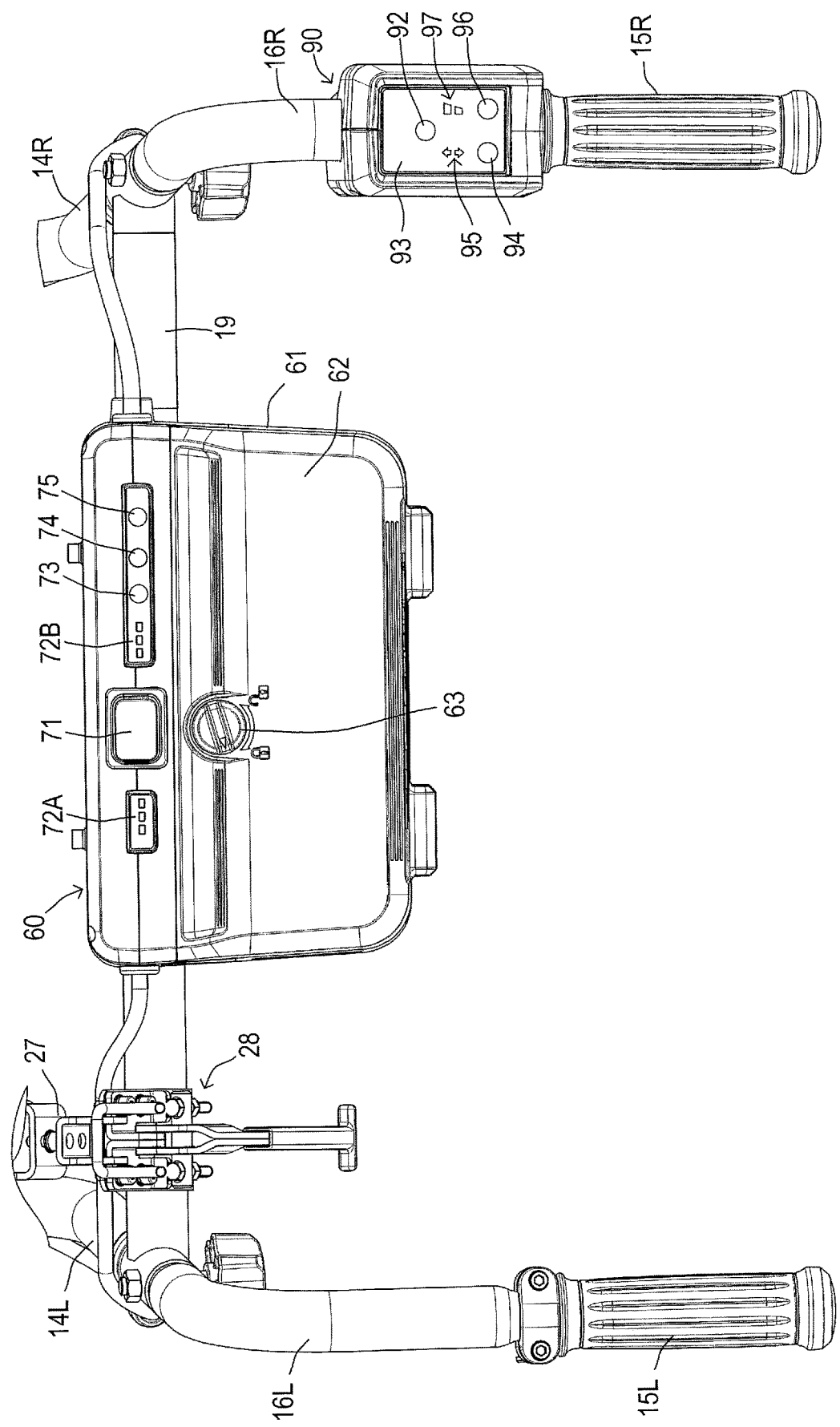

PUSH CART AND METHOD FOR CONTROLLING PUSH CART

CROSS-REFERENCE TO RELATED APPLICATIONS

The present disclosure claims the benefit of Japanese Patent Application No. 2017-139180 filed on Jul. 18, 2017 with the Japan Patent Office, the entire disclosure of which is incorporated herein by reference.

BACKGROUND

The present disclosure relates to a push cart including a wheel that can be driven by a motor.

A push cart in general includes a motor configured to drive a wheel, which is a drive wheel, and a controller that controls driving of the motor. The push cart can assist load-carrying work by a rotational force generated by the motor in response to an input of a motor drive command to the controller by a user so as to start driving the motor.

When the user is working with the push cart and carrying a load without noticing an obstacle in the front side of the moving direction of the push cart, the body of the push cart hits the obstacle. If the motor is driven at that time, the impact of the collision is so large that the body of the push cart may be deformed, or the load may fall off.

On this account, Japanese Unexamined Patent Application Publication No. 2014-166117, for example, discloses a push cart including an obstacle detector, such as an infrared sensor, that detects an obstacle in the front side of the moving direction of the push cart so as to provide a collision avoidance function.

In other words, this push cart stops the rotation of the motor in response to detection of an obstacle by the obstacle detector, and inhibits the push cart from colliding against the obstacle.

SUMMARY

The push cart is used in various work sites for carrying loads. In some use environments, dirt or dust may be adhered to the obstacle detector causing an erroneous detection of an obstacle. Or, there may be some cases where an obstacle actually exists and is detected by the obstacle detector, nevertheless, the user wants to manually move the push cart while avoiding the obstacle.

However, the above-described push cart stops the motor in response only to detection of an obstacle by the obstacle detector. Thus, the collision avoidance function may interrupt the load-carrying work and may reduce the efficiency of the work.

It is desirable that one aspect of the present disclosure provides a push cart in which the movement of the push cart can be limited without reducing the efficiency of load-carrying work in response to detection of an obstacle by an obstacle detector.

The push cart according to one aspect of the present disclosure includes a wheel, a motor, an obstacle detector, and a controller.

The motor is configured to generate a rotational force that rotates the wheel. The obstacle detector is configured to detect an obstacle that interrupts a movement of the push cart.

The controller is configured to execute, in response to detection of the obstacle by the obstacle detector, avoidance control to control driving of the motor such that the movement of push cart is limited. The controller is configured to disable execution of the avoidance control in response to a determination that specified disabling condition is satisfied.

According to the push cart of the present disclosure, the disabling condition may be set so as to avoid reduction in the efficiency of the load-carrying work by the user. Thus, if the efficiency is likely to reduce, the controller can disable the limitation in the movement of the push cart.

Consequently, according to the push cart of the present disclosure, when the obstacle is detected by the obstacle detector, the movement of the push cart can be limited, without reducing the efficiency of load-carrying work. As a result, the usability of the push cart for the user can be improved.

The disabling condition may include determining that a moving speed of the push cart is equal to or smaller than a specified speed.

Due to this configuration, while the user manually moves the push cart at low speed, the limitation in the movement of the push cart by the avoidance control can be disabled despite detection of the obstacle by the obstacle detector. Accordingly, the usability of the push cart by the user can be improved.

The obstacle detector may be configured to detect a distance to the obstacle. The disabling condition includes determining that the distance to the obstacle detected by the obstacle detector is equal to or smaller than a specified distance.

For example, in the case wherein dirt or dust is adhered to the obstacle detector and erroneously detected as an obstacle, the distance to the erroneously detected obstacle is extremely short.

However, since the disabling condition includes determining that the distance detected is equal to or smaller than the specified distance00, in the case where a dirt adhered to the obstacle detector is detected as an obstacle, limiting the movement of the push cart can be avoided.

Accordingly, this configuration of the controller can also improve the usability of the push cart for the user.

The obstacle detector may be configured, for example, to detect the distance by measuring the distance between the push cart and the obstacle. Alternatively, the obstacle detector may be configured to detect the distance by determining whether the distance to the obstacle equal to or longer than a specified distance in which the obstacle is detectable.

The controller may be configured to determine that the disabling condition is satisfied for a specified period of time since a start of driving of the motor.

For example, in a narrow area where a number of obstacles exist around the push cart, the obstacles are detected by the obstacle detector every time when the push cart starts moving by the rotational force generated by the motor. Thus, the user may not be able to carry out the load-carrying work in a favorable manner.

However, with the configuration as described above wherein the controller is configured to determine that the disabling condition is satisfied for the specified period of time since a start of driving the motor, reduction in the efficiency of the load-carrying work due to frequent interruption of the work in a narrow area can be inhibited.

Similarly, the controller may be configured to determine that the disabling condition is satisfied for a specified period of time since a start of the movement of the push cart, or for a specified period of time since a start of a forward movement of the push cart.

This configuration can allow the movement of the push cart despite detection of the obstacle in the surrounding by the obstacle detector, not only when driving the motor is started, but also when the movement of the push cart is started by a hand-push of the user.

Moreover, the controller may be configured to determine that the disabling condition is satisfied during a backward movement of the push cart. When working with the push cart, the user is usually positioned in the backward direction. Accordingly, when the push cart is moving backward, the controller does not have to execute the avoidance control.

With this configuration wherein execution of the avoidance control is disabled during the backward movement of the push cart, the load carrying work is not interrupted while the push cart is moving backward. Consequently, the usability of the push cart for the user can be improved.

The controller may be configured to determine that the disabling condition is satisfied while driving of the motor is stopped. In other words, while driving of the motor is stopped, the user manually moves the push cart. Accordingly, collision against the obstacle is less likely to happen, and even if collision takes place, the user can manage to stop the movement of the push cart. In this case, execution of the avoidance control may be disabled.

The controller may be configured to determine that the disabling condition is satisfied while the push cart is stationary. Due to this configuration, while the push cart is stationary, the avoidance control is not executed. Thus, execution of the avoidance control does not inhibit the movement of the push cart from being started.

The motor may be configured to generate a braking force that decelerates rotation of the wheel. The controller may be configured to control driving of the motor such that the braking force is generated in the avoidance control.

Due to this configuration, the movement of the push cart can be promptly limited by the braking force of the motor and collision can be avoided.

In this case, the controller may be configured to control driving of the motor in the avoidance control such that, in response to a distance to the obstacle being shorter than a specified distance, the braking force is generated that is larger than a braking force generated in response to the distance being longer than the specified distance.

Accordingly, in the case where the risk of the push cart colliding against the obstacle is relatively high, the movement of the push cart is more promptly limited by the large braking force of the motor, and thus collision can be avoided. In the case where the distance to the obstacle is long, the motor is decelerated, and, when the distance to the obstacle becomes short, the braking force is generated by the motor so as to eventually stop the motor.

The push cart may further include a brake device configured to directly limit rotation of the wheel. The controller may be configured to drive the brake device in the avoidance control.

Due to this configuration, the movement of the push cart can be promptly limited by the braking force of the brake device, and collision can be avoided. The braking force applied to the wheel can limit the movement of the push cart and avoid collision against the obstacle.

The push cart may further include a collision avoidance switch configured to command the controller to enable or disable execution of the avoidance control.

For example, in a case where the avoidance control is frequently executed by the controller and the movement of the push cart is frequently limited, the user can operate the collision avoidance switch so as to disable execution of the avoidance control by the controller and disable the limitation in the movement of the push cart. As a result, the usability of the push cart for the user can be improved.

In this case, the controller may be configured to allow execution of the avoidance control while the motor is driven despite the controller being commanded by the collision avoidance switch to disable execution of the avoidance control. This configuration can inhibit a decrease in the safety of the push cart that may be caused in the case where the collision avoidance switch is operated by mistake and execution of the avoidance control is disabled while the motor is driven, in other words, while the push cart is moving.

In this case, the controller may be configured to allow execution of the avoidance control while the push cart is moving despite the controller being commanded by the collision avoidance switch to disable execution of the avoidance control. Even when the push cart is manually moved by the user, this configuration can inhibit a decrease in the safety of the push cart that may be caused by an erroneous operation of the collision avoidance switch so as to disable execution of the avoidance control.

In the case where the collision avoidance switch is provided so as to enable or disable execution of the avoidance control by the controller, an execution alarm device may be provided. The execution alarm device may be configured to alert the user that execution of the avoidance control by the controller is enabled or disabled. This configuration allows the user to check via the execution alarm device whether execution of the avoidance control is enabled or disabled.

The push cart may further include a movement alarm device configured to alert the user that the controller is executing the avoidance control and limiting the movement of the push cart. This configuration allows the user to check, while moving the push cart, that the avoidance control is executed by the controller.

Another aspect of the present disclosure provides a method for controlling a push cart. The method includes detecting an obstacle that interrupts a movement of the push cart, executing avoidance control, in response to detection of the obstacle, to control driving of a motor such that the movement of the push cart is limited, the motor being configured to generate a rotational force that rotates a wheel of the push cart, and disabling execution of the avoidance control in response to a specified disabling condition being satisfied.

The same effect as that of the above-described push cart can be achieved by such a method.

BRIEF DESCRIPTION OF THE DRAWINGS

An example embodiment of the present disclosure will be described hereinafter by way of example with reference to the accompanying drawings, in which:

FIG. 3 is a plan view from above the push cart showing a battery box disposed between left and right handles;

DETAILED DESCRIPTION OF THE PREFERRED EMBODIMENTS

<1. Configuration>
<1-1. Overall Configuration>

Figure 1:
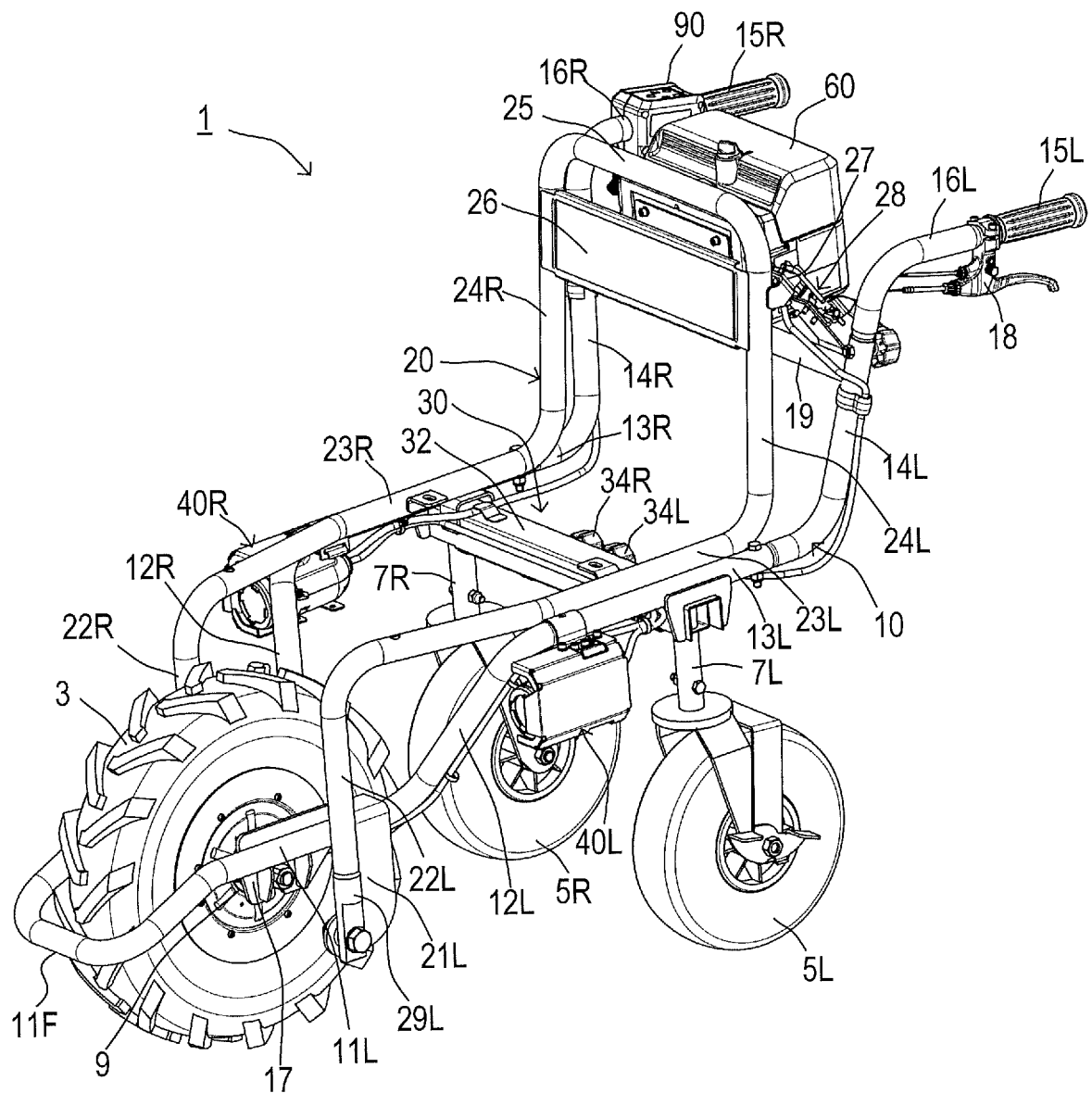
FIG. 1 is a perspective view showing a configuration of a main part of an electrically-assisted push cart according to an embodiment.

First, the overall configuration of an electrically-assisted push cart (hereinafter simply referred to as "push cart") 1 according to the present example embodiment will be described with reference to FIG. 1. The push cart 1 is a tricycle including a front wheel 3 that is a drive wheel, and left and right rear wheels 5L, 5R that are driven wheels.

The letter L attached to the reference numeral of the wheels 5 indicates that the wheel is disposed in the left side of the push cart 1 facing the front direction, and the letter R attached to the reference numeral of the wheels 5 indicates that the wheel is disposed in the right side of the push cart 1 facing the front direction. The letters L and R in the following description will be used in the same manner.

The push cart 1 includes a body frame 10, a loading bed frame 20, a rear wheel frame 30, an obstacle detector 40, a battery box 60, and an operation device 90. The body frame 10 rotatably holds the aforementioned wheels 3, 5L, 5R. The loading bed frame 20 secures a loading bed, on which a load is to be placed, to the body frame 10.

Figure 2B:
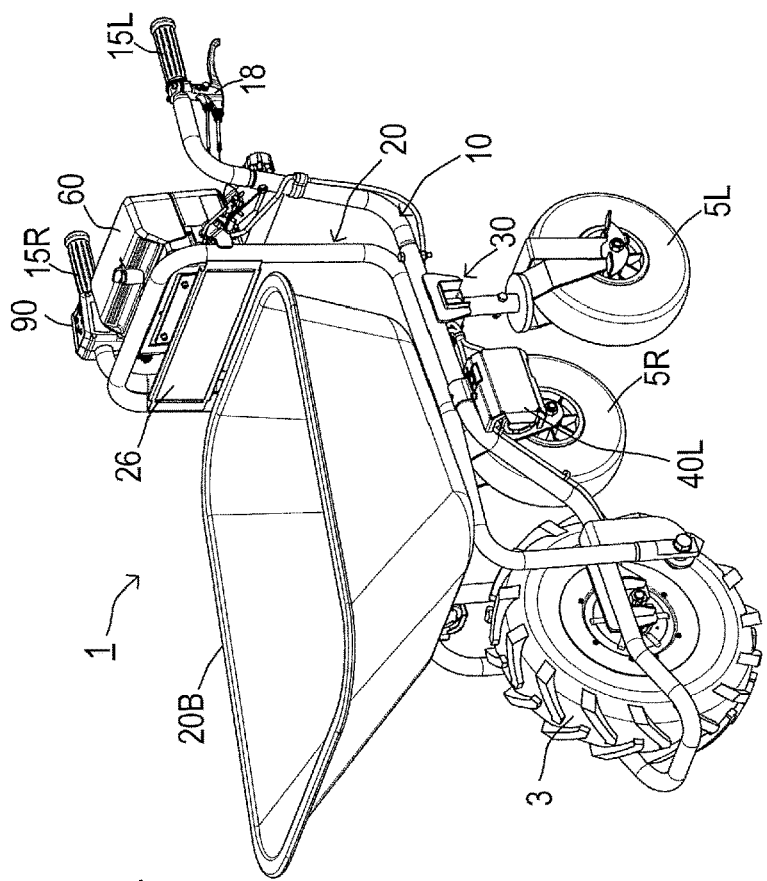
FIG. 2B is a schematic diagram showing the push cart shown in FIG. 1 with a loading bed formed with a pressed metal plate attached thereto.
Figure 2A:
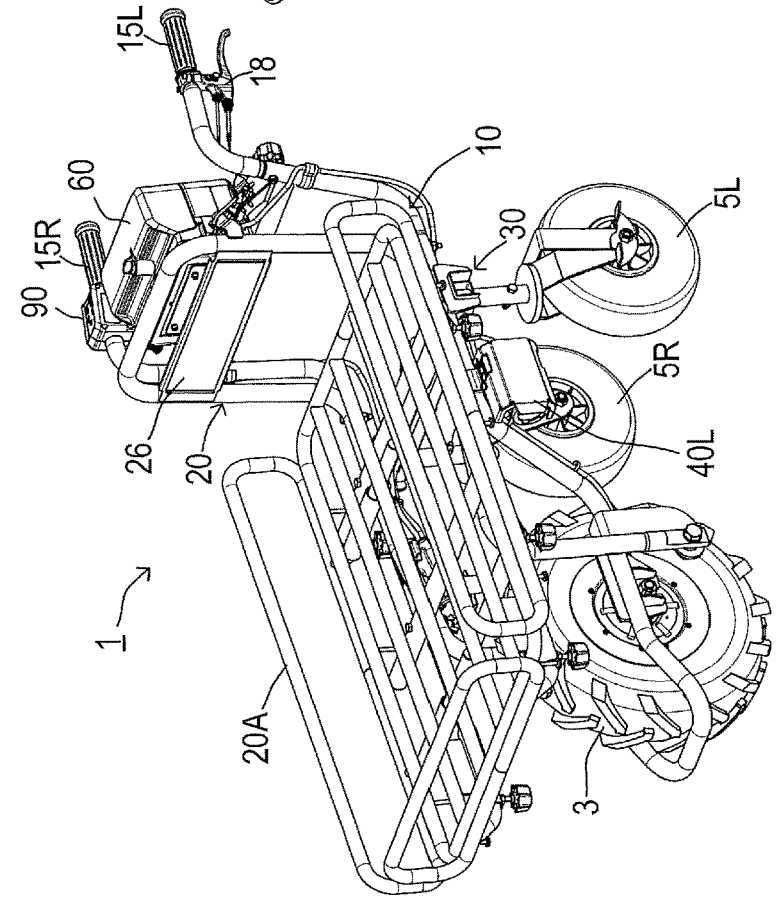
FIG. 2A is a schematic diagram showing the push cart shown in FIG. 1 with a loading bed formed with pipes attached thereto.

The loading bed frame 20 is configured such that various types of loading beds, such as a loading bed 20A shown in FIG. 2A or a loading bed 20B shown in FIG. 2B can be secured. The loading bed 20A is so-called a pallet formed by coupling pipes. The loading bed 20B is so-called a basket formed with a pressed steel plate. A user who will be carrying a load can choose the type of a loading bed depending on the type of work.

The body frame 10 and the loading bed frame 20 are formed by bending metal rod pipes. The body frame 10 and the loading bed frame 20 have symmetrical shapes in the left side and the right side of the rotational surface of the front wheel 3.

Specifically, the body frame 10 includes a leading end portion 11F, front wheel supporting portions 11L, 11R, front inclined portions 12L, 12R, placement portions 13L, 13R, rear inclined portions 14L, 14R, and handles 16L, 16R.

The leading end portion 11F is curved in a U-shape so as to surround the front wheel 3 in the front end part of the push cart 1. The front wheel supporting portions 11L, 11R are connected to the rear ends of the leading end portion 11F. The front wheel supporting portions 11L, 11R laterally interpose the rotational center portion of the front wheel 3 so as to hold and support a motor 9 installed in the rotational center portion of the front wheel 3. FIG. 1 only shows the front wheel supporting portion 11L in the left side and does not the front wheel supporting portion 11R in the right side.

Due to this configuration, the front wheel 3 is rotatably secured by the front wheel supporting portions 11L, 11R. Accordingly, the front wheel 3 is rotated by the user manually pushing the push cart 1, and rotationally driven by electrical conduction to the motor 9.

The front inclined portions 12L, 12R are respectively connected to the rear ends of the front wheel supporting portions 11L, 11R. The front inclined portions 12L, 12R extend so as to be widened in the left-right direction from the front wheel 3 and raised obliquely and upwardly.

The placement portions 13L, 13R are respectively connected to the rear ends of the front inclined portions 12L, 12R. The placement portions 13L, 13R are configured approximately horizontally such that the loading bed frame 20 can be placed thereon.

The rear inclined portions 14L, 14R are respectively connected to the rear ends of the placement portions 13L, 13R. The rear inclined portions 14L, 14R rise obliquely upward to a height where the user can push the push cart 1 by hand.

The handles 16L, 16R are respectively connected to the rear ends of the rear inclined portions 14L, 14R. The handles 16L, 16R are approximately horizontal and respectively have grips 15L, 15R attached to rear ends thereof for the user to hold.

Moreover, a brake device 17 that directly applies a braking force to the front wheel 3 is provided to the front wheel supporting portion 11L in the left side. A brake lever 18 is provided to the handle 16L in the left side for manually operating the brake device 17. For example, when the user operates the brake lever 18, brake pads of the brake device 17 are pressed against the front wheel 3, and the braking force generated by friction between the front wheel 3 and the brake pads is applied to the front wheel 3.

The rear wheel frame 30 is disposed between the left and the right placement portions 13L, 13R so as to place the loading bed frame 20 thereon and support the left and the right rear wheels 5L, 5R.

The rear wheel frame 30 includes a frame body 32 and securing members 34L, 34R. The frame body 32 is configured to secure rear wheel supporting portions 7L, 7R in a manner slidable in the left-to-right direction. To the rear wheel supporting portions 7L, 7R, the left and right rear wheels 5L, 5R are respectively rotatably secured. The securing members 34L, 34R respectively secure the rear wheel supporting portions 7L, 7R to the frame body 32 once the positions of the rear wheel supporting portions 7L, 7R are determined. Thus, the user does not have to adjust the interval between the rear wheels 5L, 5R to the interval of the left and right placement portions 13L, 13R, but can optionally determine the interval between the rear wheels 5L, 5R.

The operation device 90 is provided to the right handle 16R. The operation device 90 is operated by the user so as to set driving conditions of the motor 9 and to input a drive command for the motor 9.

The obstacle detector 40 includes an obstacle detector 40L provided to the left placement portion 13L, and an obstacle detector 40R provided to the right placement portion 13R. The obstacle detectors 40L, 40R are configured to detect obstacles that disturb the movement of the push cart 1.

Specifically, the obstacle detectors 40L, 40R respectively include ultrasonic sensors. Each of the ultrasonic sensors emits an ultrasonic wave toward the front of the push cart 1 and receives the emitted ultrasonic wave reflected at an obstacle in front of the push cart 1 so as to determine the presence or the absence of an obstacle, and to measure the distance to the obstacle.

In the present embodiment, the obstacle detector 40 includes two obstacle detectors 40L, 40R respectively disposed in the left and the right side of the push cart 1. However, there may be, for example, only one obstacle detector 40 (not shown) disposed in the front end portion of the push cart 1.

Alternatively, the obstacle detectors 40L, 40R may respectively include, for example, laser radars that search obstacles in front of the push cart by laser beams instead of ultrasonic sensors, or may respectively include infrared sensors as recited in Patent Document 1. In other words, the obstacle detectors 40L, 40R are only required to include sensors that can detect obstacles in front of the push cart 1.

Moreover, the obstacle detectors 40L, 40R may be configured to detect an unevenness of a road surface as an obstacle, in addition to objects existing on the road surface in front of the push cart 1. The obstacle detectors 40L, 40R may be configured to detect the unevenness of the road surface based on a change in, for example, the timing to receive an ultrasonic wave or an optical signal used for detection.

Furthermore, instead of a measuring function so as to measure the distance to the obstacle, the obstacle detector 40 may have a distance determination function so as to determine whether the distance to the obstacle is equal to or longer than a specified distance in which the obstacle is detectable.

Between the rear inclined portions 14L, 14R, a securing frame 19 is disposed so as to secure the battery box 60. The battery box 60 is a container that stores two battery packs that are the power source of the push cart 1. The battery box 60 is secured to the securing frame 19 and disposed between the left and right handles 16L, 16R.

The loading bed frame 20 includes leading end portions 29L, 29R, front coupling portions 22L, 22R, loading bed securing portions 23L, 23R, rising portions 24L, 24R, and a rear coupling portion 25.

Securing members 21L, 21R are secured to the front wheel supporting portions 11L, 11R of the body frame 10. The leading end portions 29L, 29R are respectively secured to the front wheel supporting portions 11L, 11R via the securing members 21L, 21R in positions lower than the rotational center of the front wheel 3 in a manner pivotable in the circumferential direction of the front wheel 3. FIG. 1 shows only the left securing members 21L, but does not show the right securing members 21R. Engagement holes are formed in the lower ends of the leading end portions 29L, 29R and the tip portions of the securing members 21L, 21R.

The leading end portions 29L, 29R are respectively attached to the securing members 21L, 21R by bolts inserted into these engagement holes. The leading end portions 29L, 29R are configured to pivot around the bolts in a specified angle range.

The front coupling portions 22L, 22R are respectively coupled to the upper ends of the leading end portions 29L, 29R. The front coupling portions 22L, 22R respectively substantially vertically extend from the leading end portions 29L, 29R to a position that is higher than the position of the front wheel 3 where the loading bed securing portions 23L, 23R, which will be described below, can be placed on the placement portions 13L, 13R of the body frame 10.

The loading bed securing portions 23L, 23R are respectively coupled to the upper ends of the front coupling portions 22L, 22R. The loading bed securing portions 23L, 23R curve approximately at right angle from the upper ends of the front coupling portions 22L, 22R toward the placement portions 13L, 13R of the body frame 10 so that the loading bed securing portions 23L, 23R can be placed on the placement portions 13L, 13R of the body frame 10.

The rising portions 24L, 24R are respectively coupled to the rear ends of the loading bed securing portions 23L, 23R. The rising portions 24L, 24R respectively vertically extend upward in front of a position where the rear inclined portions 14L, 14R of the body frame 10 rise. The rear coupling portion 25 couples the upper ends of the rising portions 24L, 24R.

The battery box 60 is placed on and secured to the securing frame 19 attached the rear inclined portions 14L, 14R of the body frame 10. The rear coupling portion 25 is positioned at approximately the same height as that of the top surface of the battery box 60. The detail of the configuration of the battery box 60 will be described below.

Between the rising portions 24L, 24R, a protection cover 26 is provided in a position lower than that of the rear coupling portion 25 located at upper ends of the loading bed frame 20. The protection cover 26 inhibits a load placed on the loading bed 20A (or 20B) from hitting the battery box 60.

The left rising portion 24L of the loading bed frame 20 is provided with a hook 27, and the securing frame 19 is provided with an engagement member 28 to be engaged with the hook 27. The engagement member 28 includes an operation lever for the user to manually engage or disengage the hook 27 and the engagement member 28. By engaging the hook 27 and the engagement member 28, the loading bed frame 20 is secured to the body frame 10. This configuration inhibits the loading bed frame 20 from being displaced in the up-down direction when the push cart 1 moves.

The loading bed frame 20 is secured to the front wheel 3 via the securing members 21L, 21R in a manner pivotable in the circumferential direction of the front wheel 3. Accordingly, the user can operate the operation lever of the engagement member 28, disengage the hook 27 and the engagement member 28, and lift up the rear coupling portion 25 at the upper end of the loading bed frame 20 so as to forwardly tilt the loading bed 20A (or 20B) that has been secured to the loading bed securing portions 23L, 23R. As a result, the user can, if necessary, drop the load on the loading bed 20A (or 20B) in front of the push cart 1.

<1-2. Configuration of Operation Device>

Next, the following describes the operation device 90 for driving the motor 9 that is provided to the right handle 16R of the body frame 10.

Figure 4:
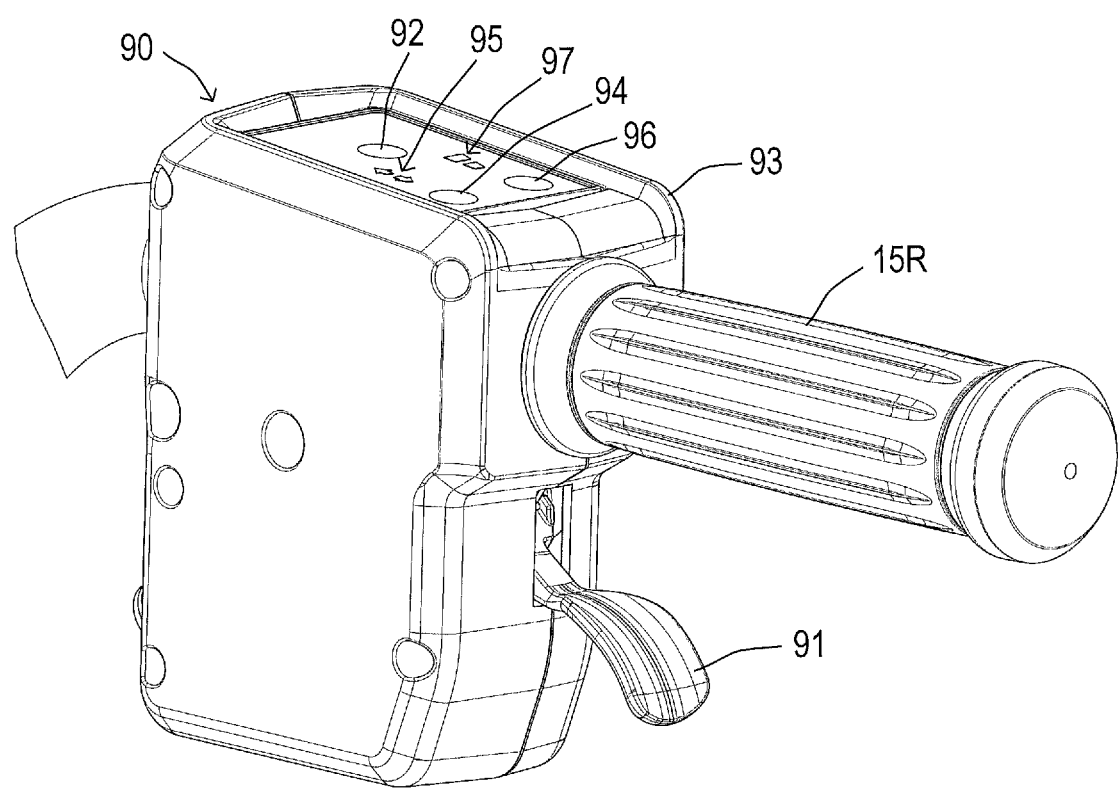
FIG. 4 is a perspective view showing an external appearance of an operation device provided to the right handle.

As shown in FIGS. 3 and 4, the operation device 90 includes a case 93, a drive lever 91, a main power switch 92, a forward/backward movement changeover switch 94, a forward/backward movement indicator 95, a high/low speed changeover switch 96, and a high/low speed indicator 97.

The case 93 is formed approximately in a cuboid, and can be attached to the handle 16R. The drive lever 91 rearwardly protrudes from the rear face of the case 93 under the grip 15R. The drive lever 91 is so-called a trigger operated by a finger of the user while the user is holding the grip 15R so as to command the rotational speed of the motor 9 (in other words, the moving speed of the push cart 1) in accordance with the pulling amount of the drive lever 91.

The main power switch 92, the forward/backward movement changeover switch 94, the forward/backward movement indicator 95, the high/low speed changeover switch 96, and the high/low speed indicator 97 are disposed on the top surface of the case 93 so that the user can operate (press) or check them from above the handle 16R.

The main power switch 92 is configured to command power supply from a battery pack 70A or a battery pack 70B, which will be described below, to the motor 9.

The forward/backward movement changeover switch 94 is configured to set the moving direction of the push cart 1 to either one of forward or backward. The moving direction of the push cart 1 (specifically the rotational direction of the motor 9) is switched every time when the forward/backward movement changeover switch 94 is operated (pressed).

The forward/backward movement indicator 95 indicates the moving direction of the push cart 1 that is set via the forward/backward movement changeover switch 94. The forward/backward movement indicator 95 is configured to show the moving direction by turning on LEDs, for example, of one of arrow-shaped indicators respectively indicating forward and backward.

The high/low speed changeover switch 96 is configured to set the speed mode of the motor 9 (in other words, the push cart 1) to a high-speed mode or a low-speed mode. Every time when the high/low speed changeover switch 96 is operated (pressed), the speed mode is changed.

The rotational speed of the motor 9 is set by multiplying an upper-limit speed corresponding to the speed mode by the ratio of the actual pulling amount of the drive lever 91 relative to the maximum pulling amount thereof. The upper-limit speed is set to a high value or a low value depending on whether the speed mode is set to the high-speed mode or the low speed mode.

The high/low speed indicator 97 shows the speed mode (the high-speed mode or the low-speed mode) set via the high/low speed changeover switch 96. The high/low speed indicator 97 is configured to show the speed mode with, for example, LEDs in a two-step manner.

In the present embodiment, to make manufacturing of the operation device 90 easy, the main power switch 92, the forward/backward movement changeover switch 94, the forward/backward movement indicator 95, the high/low speed changeover switch 96, and the high/low speed indicator 97 are mounted on a single substrate.

<1-3. Configuration of Battery Box>

Subsequently, the following describes the battery box 60 disposed between the left and right handles 16L, 16R of the body frame 10.

As shown in FIG. 3, the battery box 60 includes a box body 61, a lid 62, a lock mechanism 63, and a closed body 64. The top surface of the battery box 60 can be opened so that the two battery packs 70A, 70B (see FIG. 5) can be accommodated therein.

The lid 62 is pivotably attached to the box body 61 via a hinge so as to open and close the top surface of the box body 61. The lock mechanism 63 is provided in an open end of the lid 62 on the opposite side to where the hinge is attached. The lock mechanism 63 is configured to secure the lid 62 to the box body 61 while the lid 62 is closed.

The lock mechanism 63 includes a round member and a grip portion upwardly protruding from the round member, and is configured to be pivotable between a locking position and an unlocking position. By holding the grip portion and turning the lock mechanism 63 to the locking position, the lid 62 in a closed state can be secured to the box body 61. By holding the grip portion and turning the lock mechanism 63 to the unlocking position, the lid 62 can be opened.

The closed body 64 is configured to close a portion of the top surface of the box body 61 in a manner not to interrupt the opening and closing movement of the lid 62. The top surface of the box body 61 is covered by the lid 62 and the closed body 64. On the top surface of the closed body 64, a battery changeover switch 71, a remaining energy indicators 72A, 72B, a remaining energy indicator switch 73, a collision avoidance switch 74, and a collision avoidance indicator 75 are provided.

The battery changeover switch 71 is configured to change the battery pack to be used as the power source to either one of the battery packs 70A, 70B by the user changing the operating position of the battery changeover switch 71. The battery changeover switch 71 is disposed between the storing positions of the battery packs 70A, 70B. Due to this configuration, the user can check which battery pack is being used by the operating position of the battery changeover switch 71.

The remaining energy indicators 72A, 72B respectively show the amount of electric power accumulated in the battery packs 70A, 70B (hereinafter referred to as remaining energy). In the present embodiment, the remaining energy indicators 72A, 72B respectively include three LEDs aligned in one row, and are configured to show the amount of the remaining energy by the number of lit LEDs.

The remaining energy indicators 72A, 72B are respectively mounted on different substrates, and disposed in the vicinities of the storing positions of the corresponding battery packs 70A, 70B interposing the battery changeover switch 71 therebetween.

The remaining energy indicator switch 73, the collision avoidance switch 74, and the collision avoidance indicator 75 are provided to the substrate to which the remaining energy indicator 72B is mounted.

The remaining energy indicator switch 73 is a push-button switch configured to command the remaining energy indicators 72A, 72B to show the remaining energy.

When a command to show the remaining energy is inputted through the remaining energy indicator switch 73, the remaining energy of the battery packs 70A, 70B are shown on the remaining energy indicators 72A, 72B for a specified period of time by a control circuit 81, which will be described below, irrespective of the switching state of the battery changeover switch 71.

In the case where a battery pack is stored only in one of the storing positions of the two battery packs 70A, 70B in the battery box 60, the remaining energy of the battery pack that is actually stored is shown on the remaining energy indicator 72A or 72B that corresponds to the storing position.

In the present embodiment, in the case where one battery pack 70A or 70B is stored in the battery box 60, the power of the stored battery pack can be used for driving the motor 9 by switching the battery changeover switch 71 toward the actually stored battery pack.

The collision avoidance switch 74 is a push-button switch configured to provide a command to enable or disable execution of the avoidance control by the control circuit 81 when an obstacle is detected by the obstacle detectors 40L, 40R. The avoidance control is to control driving of the motor 9 so as to decelerate or stop the motor 9. Hereinafter, the function achieved by the control circuit 81 executing the avoidance control will be referred to a collision avoidance function. Moreover, the avoidance control being enabled will be also referred to as the collision avoidance function being activated. Execution of the avoidance control being disabled will be also referred to as the collision avoidance function being deactivated.

The collision avoidance indicator 75 indicates whether the collision avoidance function is activated or deactivated, and also indicates, when the collision avoidance function is activated, that the rotation of the motor 9 is reduced or stopped by the collision avoidance function.

Specifically, the collision avoidance indicator 75 includes an LED and configured such that the LED turns on when the collision avoidance function is activated, and the LED flickers when the rotation of the motor 9 is reduced or stopped by the collision avoidance function. Accordingly, the collision avoidance indicator 75 serves as the alarm device of the present disclosure, and configured to alert the user to execution of the avoidance control.

<1-4. Circuit Configuration>

A circuit board 80 is stored inside the closed portion of the battery box 60 where the battery changeover switch 71 and the remaining energy indicators 72A, 72B are provided.

Figure 5:
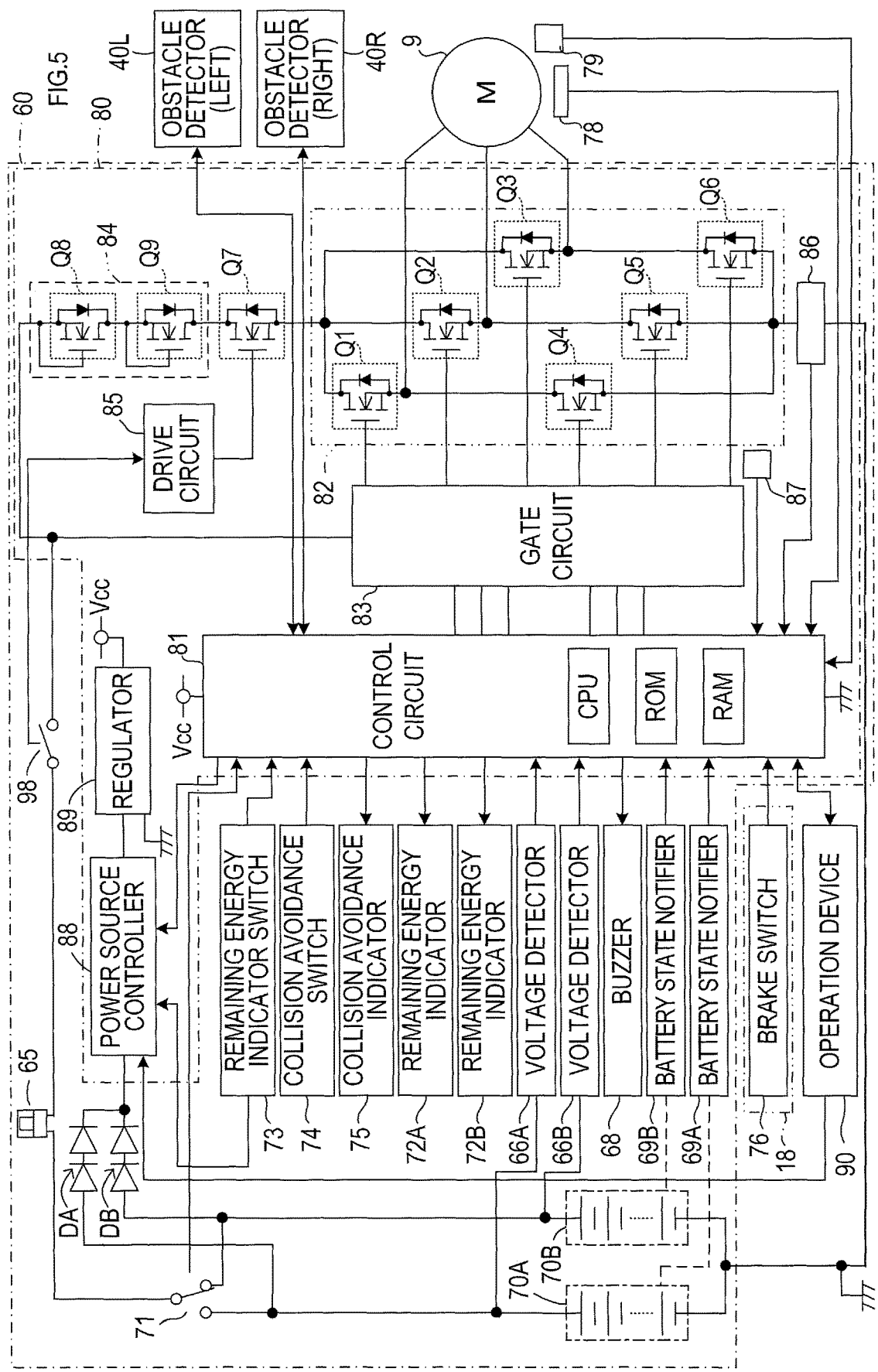
FIG. 5 is a block diagram showing a configuration of an entire electric system of the push cart according to the embodiment.

As shown in FIG. 5, on the circuit board 80, the control circuit 81, an inverter 82, a gate circuit 83, a regeneration inhibitor 84, a drive circuit 85, a current detector 86, an element temperature detector 87, a power source controller 88, and a regulator 89 are provided.

The control circuit 81 corresponds to the controller according to the present disclosure, and is configured to control driving of the motor 9 and the obstacle detectors 40L, 40R.

The inverter 82 is a circuit configured to allow the flow of drive current to the motor 9 upon receiving power supply from the battery pack 70A or 70B stored the battery box 60. In the present embodiment, the motor 9 is a three-phase brushless motor, and thus the inverter 82 is a three-phase full bridge circuit including six switching elements Q1 to Q6. In the present embodiment, the six switching elements Q1 to Q6 are N-channel MOSFETs.

The three switching elements Q1 to Q3 are provided, as so-called high-side switches, between three terminals of the motor 9 and a positive-side current conduction path coupled to the positive side of the battery pack 70A or 70B.

The remaining three switching elements Q4 to Q6 are provided, as so-called low-side switches, between the three terminals of the motor 9 and a negative-side current conduction path coupled to the negative side of the battery pack 70A or 70B.

The positive-side current conduction path is coupled between the inverter 82 and the positive side of the battery pack 70A or 70B via the battery changeover switch 71. In the positive-side current conduction path, a key inserting portion 65 and a trigger switch 98 are provided between the battery changeover switch 71 and the inverter 82.

The key inserting portion 65 is provided inside the box body 61 of the battery box 60. By insertion of a key, the conductive portion of the key provides continuity and, as a result, completes the positive-side current conduction path.

The trigger switch 98 is turned on when the user operates the drive lever 91 (so-called a trigger) provided to the operation device 90.

Accordingly, while the key is inserted into the key inserting portion 65 and the drive lever 91 is operated, the positive-side current conduction path from the battery pack 70A or 70B to the inverter 82 (consequently, to the motor 9) is completed allowing driving of the motor 9.

The gate circuit 83 switches on and off the switching elements Q1 to Q6 in the inverter 82 in accordance with control signals outputted from the control circuit 81 so as to allow the flow of electric current to each of the phase windings of the motor 9 and rotate the motor 9. By rotating the motor 9 in the normal direction, the motor 9 generates rotational force that rotates the front wheel 3. Moreover, by rotating the motor 9 in the reverse direction, the motor 9 generates the braking force that decelerates the rotation of the front wheel 3.

In the positive-side current conduction path, the regeneration inhibitor 84 is disposed between the trigger switch 98 and the inverter 82. The regeneration inhibitor 84 includes two reverse flow inhibiting elements configured to inhibit regenerative current from flowing from the inverter 82 to the positive side of the battery pack 70A or 70B.

In general, a reverse flow inhabiting diode is used as the reverse flow inhibiting element in order to inhibit the reverse flow of electric current. In the present embodiment, the regeneration inhibitor 84 includes, as the reverse flow inhibiting elements, switching elements Q8, Q9 that are configured identically to the switching elements Q1 to Q6 of the inverter 82.

In other words, each of the switching elements Q8, Q9 is an N-channel MOSFET, and configured to inhibit regenerative current from flowing by a parasitic diode of the MOSFET.

On that account, the switching elements Q8, Q9 are coupled to the positive-side current conduction path in a direction opposite to the direction of the switching elements Q1 to Q6 of the inverter 82. That is, the switching elements Q8, Q9 are disposed in such a manner wherein the anodes of the parasitic diode are directed toward the positive sides of the battery packs 70A, 70B and the cathodes of the parasitic diodes are directed toward the negative side of the battery packs 70A, 70B so that drive current of the motor 9 flows in the normal direction.

In the regeneration inhibitor 84, the switching elements Q8, Q9 are serially connected to the positive-side current conduction path. This is to inhibit regenerative current from flowing, even if one of the switching elements Q8 or Q9 is short-circuited, using the other switching element.

The drive circuit 85 is configured to turn on a switching element Q7 while the trigger switch 98 is in an ON state. The drive circuit 85 is disposed between the regeneration inhibitor 84 and the inverter 82 in the positive-side current conduction path.

In other words, the drive circuit 85 is configured to more reliably interrupt the conduction in the positive-side current conduction path, while the trigger switch 98 is off, by additionally turning off the switching element Q7.

The current detector 86 is disposed between the inverter 82 and the negative side of the battery packs 70A, 70B in the negative-side current conduction path. The current detector 86 includes a shunt resistor as a current detecting element, and is configured to detect drive current flowing to the motor 9.

The element temperature detector 87 includes a temperature detecting element, such as a thermistor, and is configured to detect the temperature of the inverter 82 (specifically, the temperature of the switching elements Q1 to Q6 of the inverter 82).

Detection signals from the current detector 86 and the element temperature detector 87 are inputted to the control circuit 81.

To the motor 9, a rotational position detector 78 and a motor temperature detector 79 are provided. The rotational position detector 78 is configured to detect the rotational position (angle) of the motor 9. The motor temperature detector 79 is configured to detect the temperature of the motor 9. Detection signals from these detectors 78, 79 are also inputted to the control circuit 81.

The power source controller 88 is coupled between diodes DA, DB respectively coupled to the battery packs 70A, 70B and the regulator 89. The power source controller 88 receives the battery power directly from the positive side of the battery packs 70A, 70B (not through the key inserting portion 65) via the diodes DA, DB and supplies the power to the regulator 89.

Due to this configuration, while the current conduction path to the motor 9 is interrupted by removal of the key from the key inserting portion 65, the electric power can be still supplied to the regulator 89 from the battery packs 70A, 70B via the power source controller 88.

The diodes DA, DB respectively include two diodes for inhibiting reverse flow. The two diodes for inhibiting reverse flow are serially coupled such that their anodes are directed toward the positive side of the batteries 70A, 70B and their cathodes are directed toward the power source controller 88.

This arrangement is to, if one of the two diodes of the diode DA (or DB) is short-circuited, inhibit charging current from flowing from the battery pack 70B (or 70A) to the battery pack 70A (or 70B) via the short-circuited diode.

The power source controller 88 is configured to cut off supply of the battery power to the regulator 89 in accordance with a command from the control circuit 81. Moreover, the power source controller 88 is also configured to start supplying the battery power to the regulator 89 when one of the remaining energy indicator switch 73 and the collision avoidance switch 74 provided to the battery box 60, and the main power switch 92 provided to the operation device 90 is operated and a signal from the operated switch is inputted.

The regulator 89 is configured to generate power-supply voltage (direct current constant voltage) Vcc for operating the control circuit 81 and its peripheral circuits from the battery power supplied from the power source controller 88, and supply the power-supply voltage Vcc to each of these circuits.

Due to this configuration, while the control circuit 81 is operated, the control circuit 81 can stop its operation by outputting a command to the power source controller 88 so as to stop the power supply from the regulator 89. Moreover, while the operation of the control circuit 81 is stopped, the user can operate, for example, the main power switch 92 and the remaining energy indicator switch 73 so as to activate the control circuit 81 and allow the control circuit 81 to execute various control operations.

The control circuit 81 includes a micro control unit (MCU) including, for example, a CPU, a ROM, and a RAM. The control circuit 81 is configured to control drive current that flows to the motor 9 via the gate circuit 83 so as to control driving of the motor 9 (that is, rotational speed and rotational direction).

Moreover, the control circuit 81 controls, for example, transmission and reception of ultrasonic waves by the obstacle detectors 40L, 40R, indication of the remaining energy on the remaining energy indicators 72A, 72B, and indication of the moving direction and the specified speed on the forward/backward movement indicator 95 and the high/low speed indicator 97 of the operation.

Accordingly, the rotational position detector 78, the motor temperature detector 79, the gate circuit 83, the current detector 86, the element temperature detector 87, and the power source controller 88 are coupled to the control circuit 81. In addition, the obstacle detectors 40L, 40R, the indicators and switches provided to the battery box 60 and the operation device 90 are also coupled to the control circuit 81.

Specifically, to the control circuit 81, the remaining energy indicators 72A, 72B, the remaining energy indicator switch 73, the collision avoidance switch 74, and the collision avoidance indicator 75 provided to the battery box 60 are coupled. Moreover, a signal indicating the selected battery pack 70A or 70B is inputted into the control circuit 81 from the battery changeover switch 71.

Figure 6:
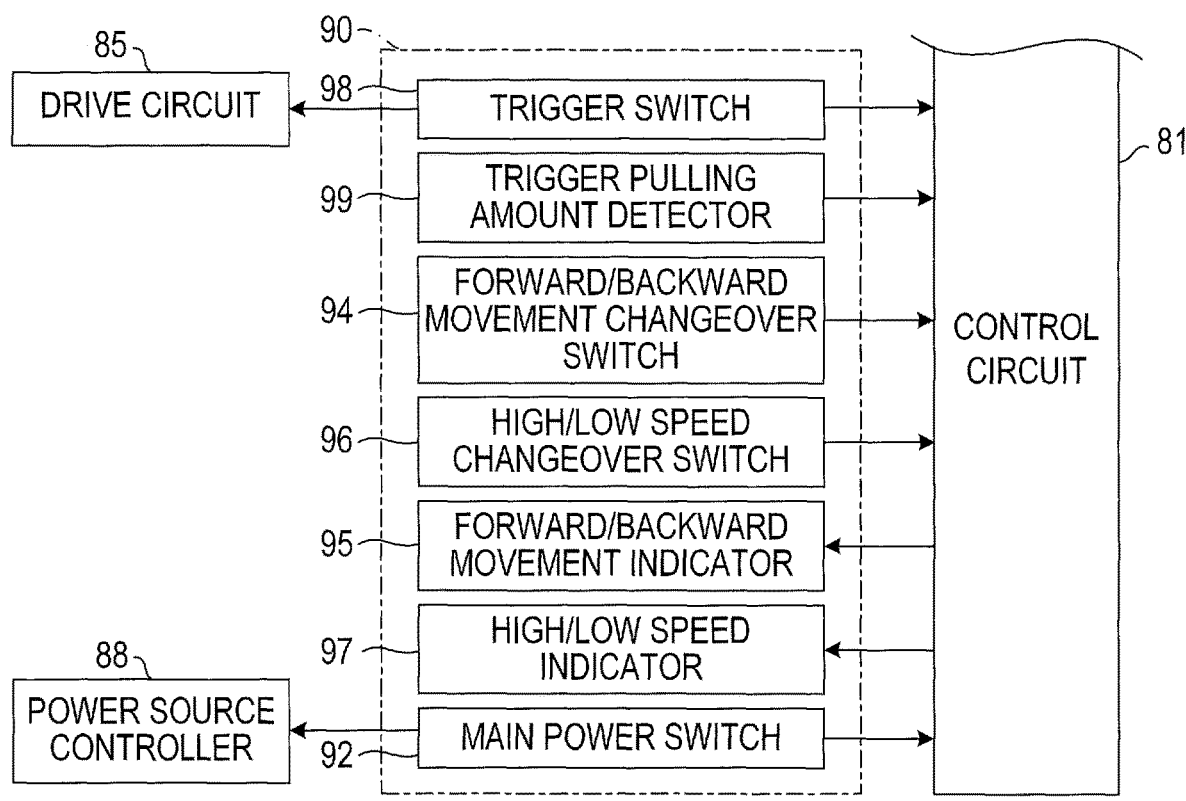
FIG. 6 is a block diagram showing a detailed configuration of the operation device in FIG. 5.

Furthermore, as shown in FIG. 6, the main power switch 92, the forward/backward movement changeover switch 94, the forward/backward movement indicator 95, the high/low speed changeover switch 96, the high/low speed indicator 97, the trigger switch 98, and a trigger pulling amount detector 99 provided to the operation device 90 are coupled to the control circuit 81. The trigger pulling amount detector 99 is configured to detect the pulling amount of the drive lever 91.

As shown in FIG. 5, the battery box 60 is provided with voltage detectors 66A, 66B and a buzzer 68. The voltage detectors 66A, 66B are configured to respectively detect output voltages (that is, battery voltages) from the battery packs 70A, 70B. The buzzer 68 is configured to generate alarm sound when, for example, an abnormality takes place. In addition to batteries, the battery packs 70A, 70B respectively incorporate battery state notifiers 69A, 69B configured to notify the control circuit 81 of the states of the batteries.

The brake lever 18 is provided with a brake switch 76. The brake switch 76 is configured to be in an ON state while the brake lever 18 is operated (in other words, while the brake device 17 is working).

These components, that is, the voltage detectors 66A, 66B, the buzzer 68, the battery state notifiers 69A, 69B, and the brake switch 76 are also coupled to the control circuit 81.

<2. Process>
<2-1. Main Process>

Figure 7:
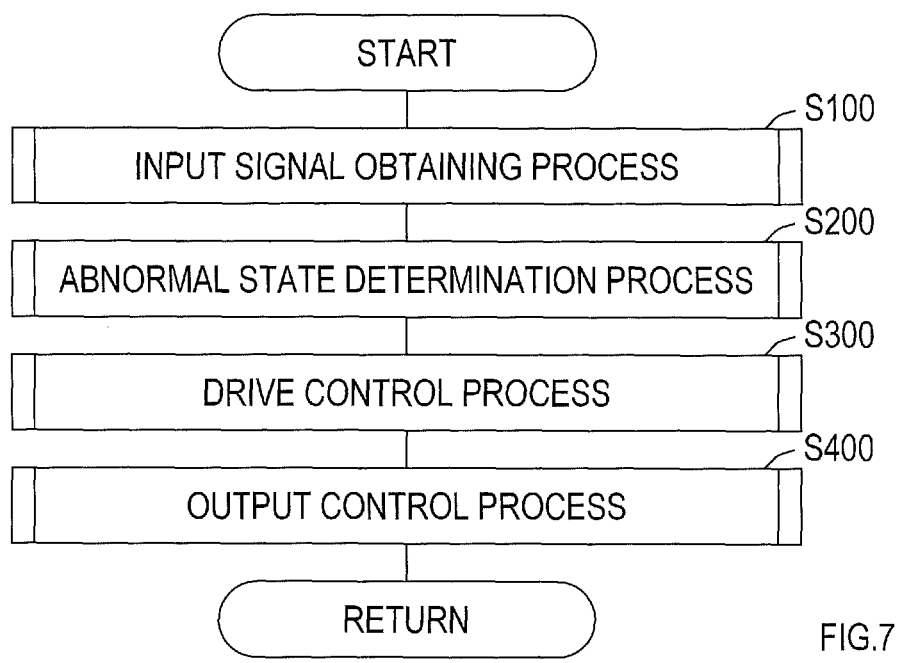
FIG. 7 is a flowchart illustrating a control process executed by a control circuit.

With reference to the flowchart of FIG. 7, the following describes one of the main processes executed by the control circuit 81. The control circuit 81 is activated upon receiving power supply from the regulator 89, and repeatedly executes the control process shown in FIG. 7 with specified time intervals as one of the main routines.

First, in S100 (S represents Step), an input signal obtaining process is executed. In the input signal obtaining process, input signals from the above-described various switches and detectors are obtained.

In S200, an abnormal state determination process is executed. In the abnormal state confirmation process, it is determined whether an abnormal state has occurred based on the input signals obtained in S100. The detail of the abnormal state determination process will be described below.

In S300, based on the determination results in S100 and S200, a drive control process for the motor 9 is executed. The drive control process for the motor 9 allows the motor 9 to be normally driven, stopped, or decelerated. The detail of the drive control process for the motor 9 will be described below. Finally, in S400, an output control process is executed. In the output control process, indication on the above-described various indicators and driving of the buzzer are performed. The detail of the output control process will be described below. Then, the control process is terminated.

<2-2. Abnormal State Determination Process>

Figure 8:
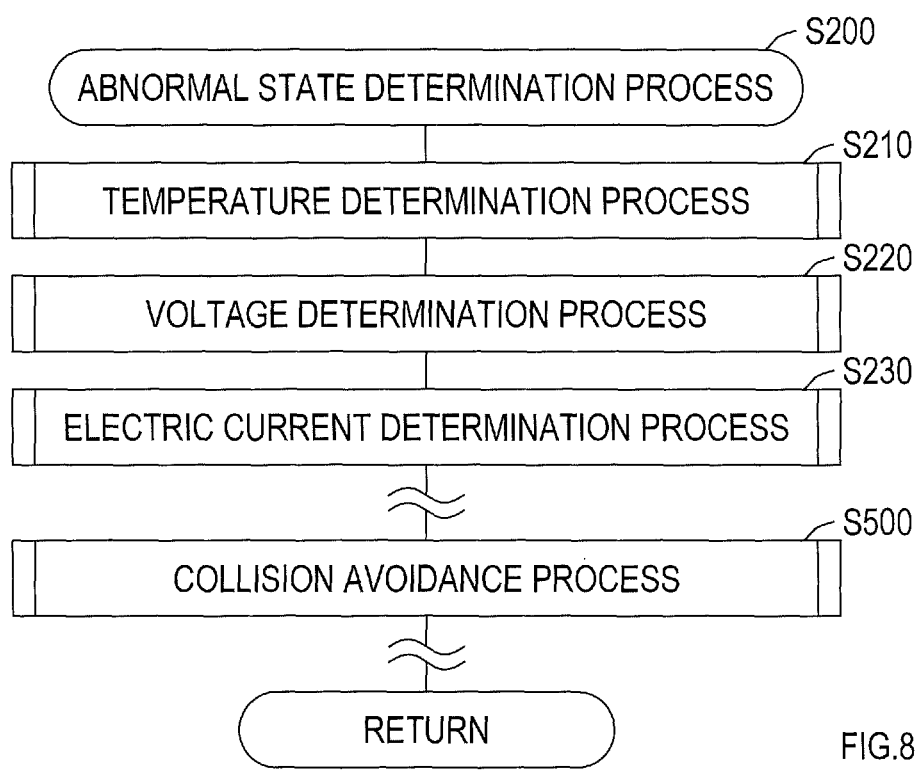
FIG. 8 is a flowchart illustrating an abnormal state determination process shown in FIG. 7.

With reference to the flowchart of FIG. 8, the following describes the abnormal state determination process in S200. In the abnormal state confirmation process, it is determined based on the results of detection by the above-described various detectors, whether the driving system of the motor 9 is in a normal state or an abnormality state has occurred.

In S210, it is determined whether the temperature of the motor 9 is normal. In S220, it is determined whether the voltage applied to the motor 9 is normal. In S230, it is determined whether electric current flowing to the motor 9 is normal. Accordingly, whether the driving system of the motor 9 is in a normal state is checked.

In S500, a collision avoidance process is executed. The collision avoidance process is executed so as to avoid collision of the push cart 1 against an obstacle based on the results of detection by the obstacle detectors 40L, 40R. The detail of the collision avoidance process will be described below.

<2-3. Collision Avoidance Process>

Figure 9:
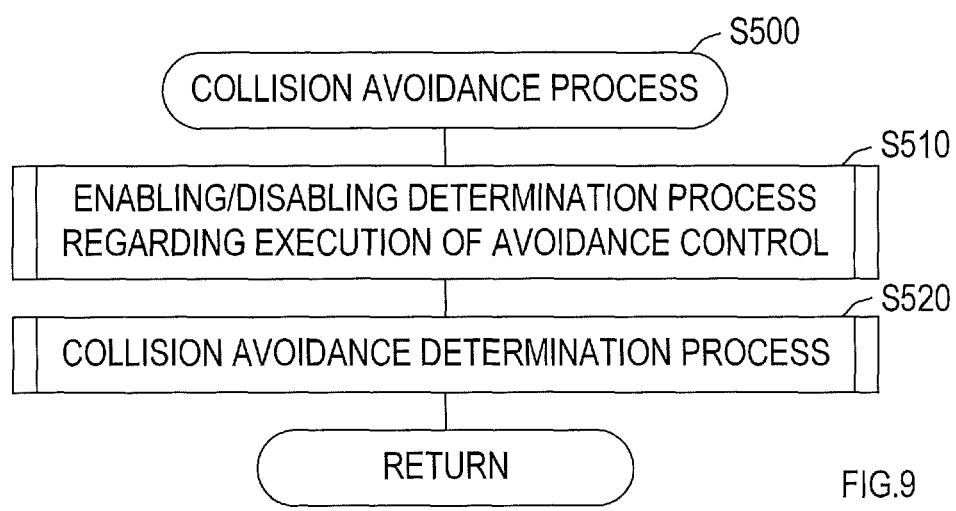
FIG. 9 is a flowchart illustrating a collision avoidance process shown in FIG. 8.

With reference to the flowchart of FIG. 9, the following describes the collision avoidance process in S500.

First, in S510, an enabling/disabling determination process is executed so as to determine whether execution of avoidance control should be enabled or disabled. The avoidance control is executed so as to limit the movement of the push cart 1. Subsequently, in S520, based on the results of detection by the obstacle detectors 40L, 40R, a collision avoidance determination process is executed so as to determine whether the avoidance control should be executed.

<2-4. Enable/Disable Determination Process>

Figure 10:
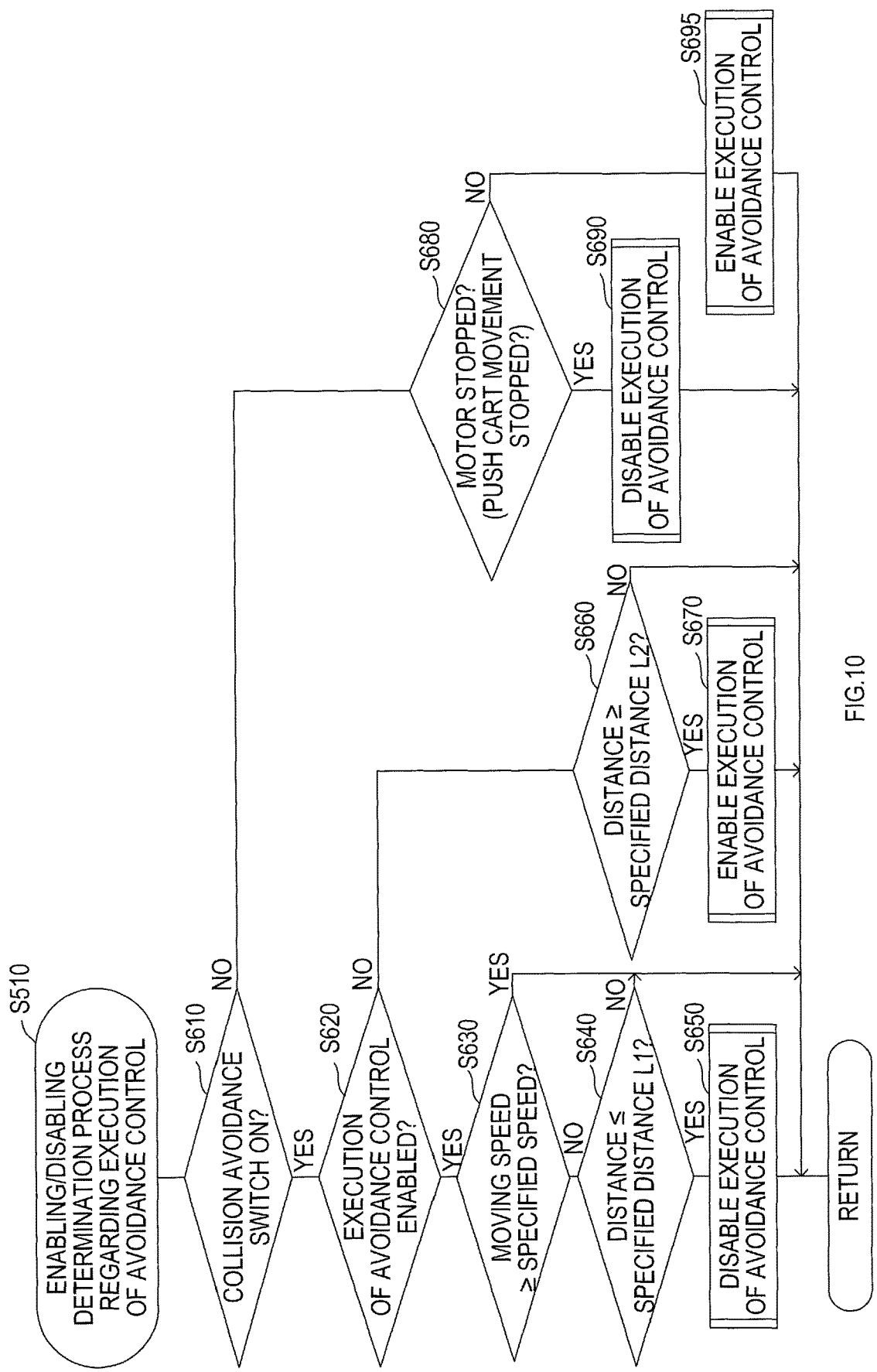
FIG. 10 is a flowchart illustrating an enabling/disabling determination process regarding execution of an avoidance control shown in FIG. 9.

With reference to the flowchart of FIG. 10, the following describes the enabling/disabling determination process in S510.

First, in S610, it is determined whether the collision avoidance switch 74 is in an ON state. In response to a determination that the collision avoidance switch 74 is in the ON state, the process proceeds to S620 wherein it is determined whether execution of the avoidance control is currently enabled.

In response to a determination in S620 that execution of the avoidance control is currently enabled, the process proceeds to S630. In S630, it is determined whether the moving speed of the push cart 1 is at specified speed set in advance or more. In response to a determination in S630 that the moving speed of the push cart 1 is at the specified speed or more, the determination process is terminated.

In the present embodiment, the moving speed of the push cart 1 is calculated from the rotational speed of the motor 9. Alternatively, the front wheel 3 of the push cart 1, or the left and right rear wheels 5L, 5R may be provided with a rotation sensor/rotation sensors so as to calculate the moving speed of the push cart 1 based on the output of the sensor(s).

Subsequently, in response to a determination in S630 that the moving speed of the push cart 1 is smaller than specified speed (in other words, moving at low speed), the process proceeds to S640. In S640, it is determined whether the distance to an obstacle detected by the obstacle detectors 40L, 40R is a specified distance L1 set in advance or smaller.

The specified distance is a determination value for determining that the distance to the obstacle cannot be normally measured due to dirt or dust adhered to the obstacle detector 40L or 40R.

In S640, one of the distances to the obstacle detected by the obstacle detectors 40L, 40R that is shorter than the other is compared to the specified distance L1.

If it is determined, in S640, that the distance to the obstacle is specified distance L1 or smaller, the distance is not normally measured by the obstacle detector 40L or 40R. Thus, in response to a determination that the distance to the obstacle is specified distance L1 or smaller, the process proceeds to S650. In S650, execution of the avoidance control is disabled, and then the determination process is terminated.

On the other hand, in S640, if it is determined that the distance to the obstacle is longer than the specified distance L1, the obstacle detectors 40L and 40R are working normally. Thus, in response to a determination that the distance to the obstacle is longer than the specified distance L1, the determination process is terminated.

Subsequently, in response to a determination in S620 that execution of the avoidance control is currently disabled, the process proceeds to S660. In S660, it is determined whether the distance to the obstacle is a specified distance L2 or more.

The specified distance L2 used in the determination in S660 may be the same distance as, or different distance from the specified distance L1 used in S640. In S660, one of the distances to the obstacle detected by the obstacle detectors 40L, 40R that is shorter the other is compared to the specified distance L2 similarly in S640.

In S660, if it is determined that the distance to the obstacle is the specified distance L2 or more, the obstacle detectors 40L, 40R are working normally. Thus, in response to a determination that the distance to the obstacle is the specified distance L2 or more, the process proceeds to S670. In S670, execution of the avoidance control is enabled, and then the determination process is terminated.

On the other hand, in S660, if it is determined that the distance to the obstacle is shorter than the specified distance L2, dirt or dust is adhered to the obstacle detector 40L or 40R, and the distance to the obstacle is not normally measured. Thus, in response to a determination that the distance to the obstacle is shorter than the specified distance L2, the determination process is terminated.

Subsequently, in response to a determination in S610 that the collision avoidance switch 74 is in an OFF state, the process proceeds to S680. In S680, it is determined whether driving of the motor 9 is currently stopped.

In response to a determination in S680 that driving of the motor 9 is currently stopped, the process proceeds to S690. In S690, the execution of the avoidance control is disabled, and then the determination process of S510 is terminated. On the other hand, in response to a determination in S680 that driving of the motor 9 is not currently stopped (in other words, the motor 9 is driven), the process proceeds to S695 wherein execution of the avoidance control is enabled. Then, the determination process is terminated.

In other words, execution of the avoidance control is not disabled (allowed) in S680 and S690 while the motor 9 is driven, even if the collision avoidance switch 74 is turned off and a command to disable execution of the avoidance control is sent. This configuration inhibits a decrease in the safety of the push cart 1 that may be caused in the case where the user operates the collision avoidance switch 74 by mistake and the avoidance control is disabled while the motor 9 is driven.

In S680, instead of determining whether driving of the motor 9 is currently stopped, as described in a bracket in FIG. 10, it may be determined whether the push cart 1 has stopped moving.

In this way, execution of the avoidance control is not disabled (allowed) while the push cart 1 is moving even if the collision avoidance switch 74 being turned off, and the same effect as the effect described above can be achieved.

<2-5. Collision Avoidance Determination Process>

Figure 11:
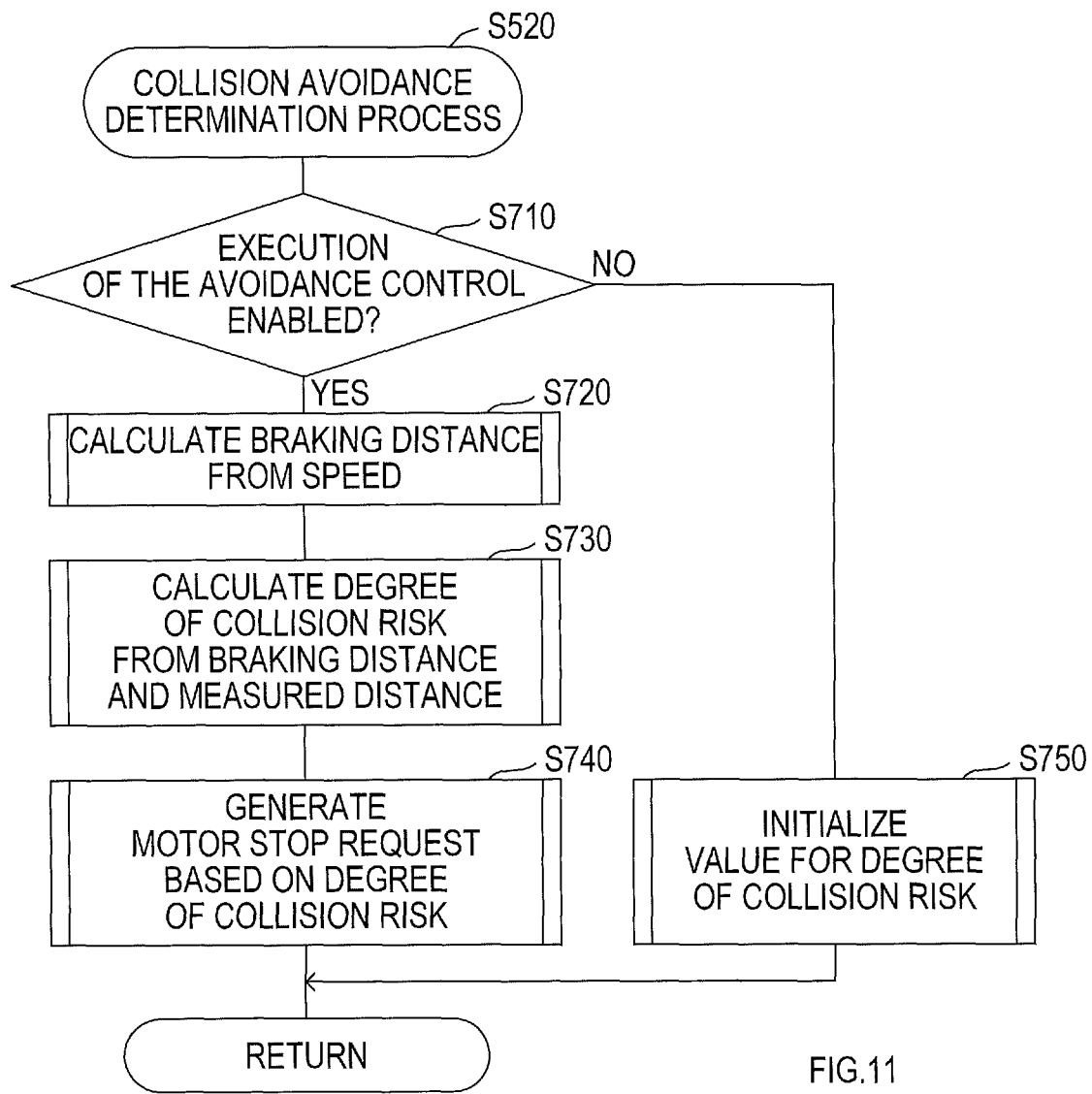
FIG. 11 is a flowchart illustrating a collision avoidance determination process shown in FIG. 9.

With reference to the flowchart of FIG. 11, the following describes the collision avoidance determination process in S520.

First, in S710, it is determined whether execution of the avoidance control is enabled. In response to a determination that the avoidance control is enabled, the process proceeds to S720.

In S720, based on the moving speed of the push cart 1, a braking distance is calculated. The braking distance is a distance that is necessary for the push cart 1 to be stopped by the braking force generated by the motor 9.

In S730, based on the braking distance calculated in S720 and the distance to the obstacle (measured distance) detected by the obstacle detectors 40L, 40R, the degree of risk of the push cart 1 colliding with the obstacle is calculated.

In S730, one of the distances to the obstacle detected by the obstacle detectors 40L, 40R that is shorter than the other is used as the measured distance. In comparison between the measured distance and the braking distance, the degree of risk indicating the possibility of collision with the obstacle is calculated.

In S740, based on the degree of the risk calculated in S730, a stop request is generated so that the motor 9 generates the braking force and stops the push cart 1, and then the collision avoidance determination process is terminated.

On the other hand, in response to a determination in S710 that execution of the avoidance control is not enabled, the process proceeds to S750. In S750, the value for the degree of collision risk is initialized to a specified value (for example, zero), and then the collision avoidance determination process is terminated.

<2-6. Motor Control Process>

Figure 12:
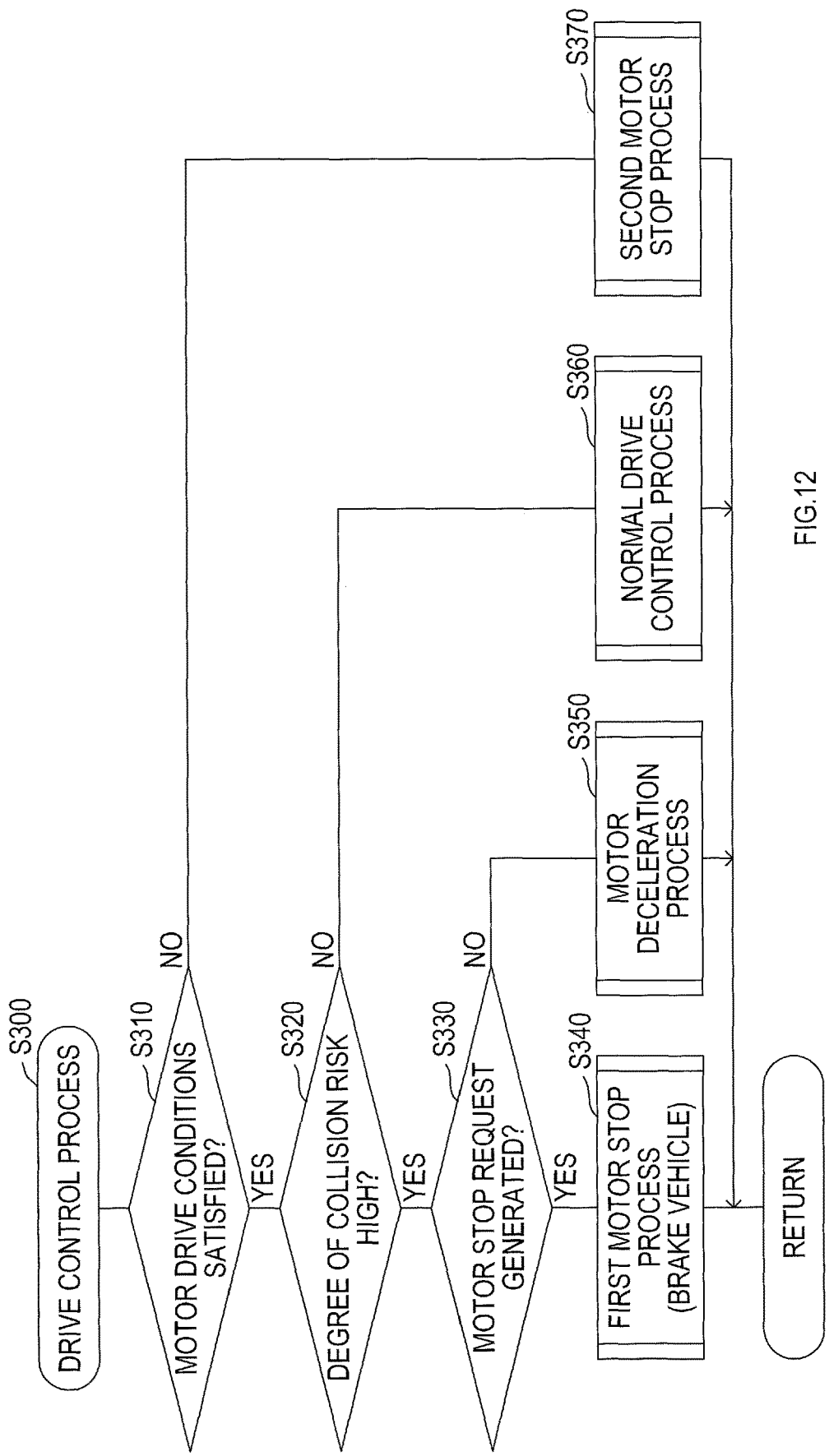
FIG. 12 is a flowchart illustrating a motor control process shown in FIG. 7.

With reference to the flowchart of shown in FIG. 12, the following describes the motor control process in S300. First, in S310, it is determined whether the driving conditions of the motor 9 are satisfied. The driving conditions of the motor 9 are, for example, the trigger switch 98 being in the ON state, and the brake switch 76 being in the OFF state.

In response to the driving conditions of the motor 9 being satisfied, the process proceeds to S320. In S320, it is determined whether the degree of collision risk calculated in the above-described collision avoidance determination process is higher than a specified determination value set in advance. In response to a determination that the degree of collision risk being higher than the determination value, the process proceeds S330.

In S330, it is determined whether the request to stop the motor 9 has been generated in the above-described avoidance control determination process. In response to a determination that the request to stop the motor 9 has been generated, the process proceeds to S340. In S340, a first motor stop process is executed. In the first motor stop process, the phase windings of the motor 9 are short-circuited, for example, so that the motor 9 generates the braking force and stops the movement of the push cart 1. Subsequently, the motor control process is terminated.

On the other hand, in response to a determination in S330 that the request to stop the motor 9 has not been generated, the process proceeds to S350. In S350, a motor deceleration process is executed so as to decelerate the motor 9, and then the motor control process is terminated. In S350, the motor 9 is decelerated in accordance with the degree of collision risk. For example, the driving force of the motor 9 is reduced from the usual driving force when the degree of risk is relatively low, while the motor 9 generates the braking force so as to decelerate the motor 9 when the degree of risk is relatively high. Subsequently, the motor control process is terminated.

In response to a determination in S320 that the degree of collision risk is lower than the determination value, the process proceeds to S360. In S360, normal drive control of the motor 9 is executed.

That is, in S360, the rotational direction and the rotational speed of the motor 9 are set based on, for example, the speed mode set by the high/low speed changeover switch 96, the moving direction set by the forward/backward movement changeover switch 94, the pulling amount of the drive lever 91 detected by the trigger pulling amount detector 99.

The conduction current flowing to the motor 9 is controlled via the gate circuit 83 and the inverter 82 such that the rotational direction and the rotational speed correspond to the settings. Subsequently, the motor control process is terminated.

On the other hand, in response to a determination in S310 that the driving conditions for the motor 9 have not been satisfied, the process proceeds to S370. In S370, a second motor stop process is executed. In the second motor stop process, the current conduction to the motor 9 is interrupted and the motor 9 enters a free-run state. Subsequently, the motor control process is terminated.

As described above, in the motor control process, if the degree of collision risk calculated in the above-described collision avoidance determination process is high, the rotational force or the braking force of the motor 9 is controlled so as to decelerate the push cart 1.

Accordingly, the user can move the push cart 1 using the rotational force of the motor 9 within a range wherein the push cart 1 does not collide with the obstacle. Consequently, the user can effectively carry a load by the push cart 1. In the case where the degree of collision risk further increases and the request to stop the motor 9 is generated, a larger braking force is generated by the motor 9 so as to stop the motor 9. As a result, safety can be ensured.

<2-7. Output Control Process>

The following describes the output control process in S400. The output control process, includes, in relation to the above-described collision avoidance process, an activation/deactivation alerting process for alerting the user to activation/deactivation of the collision avoidance function, and an execution status alerting process for alerting the user to the execution status of the avoidance control.

Figure 13:
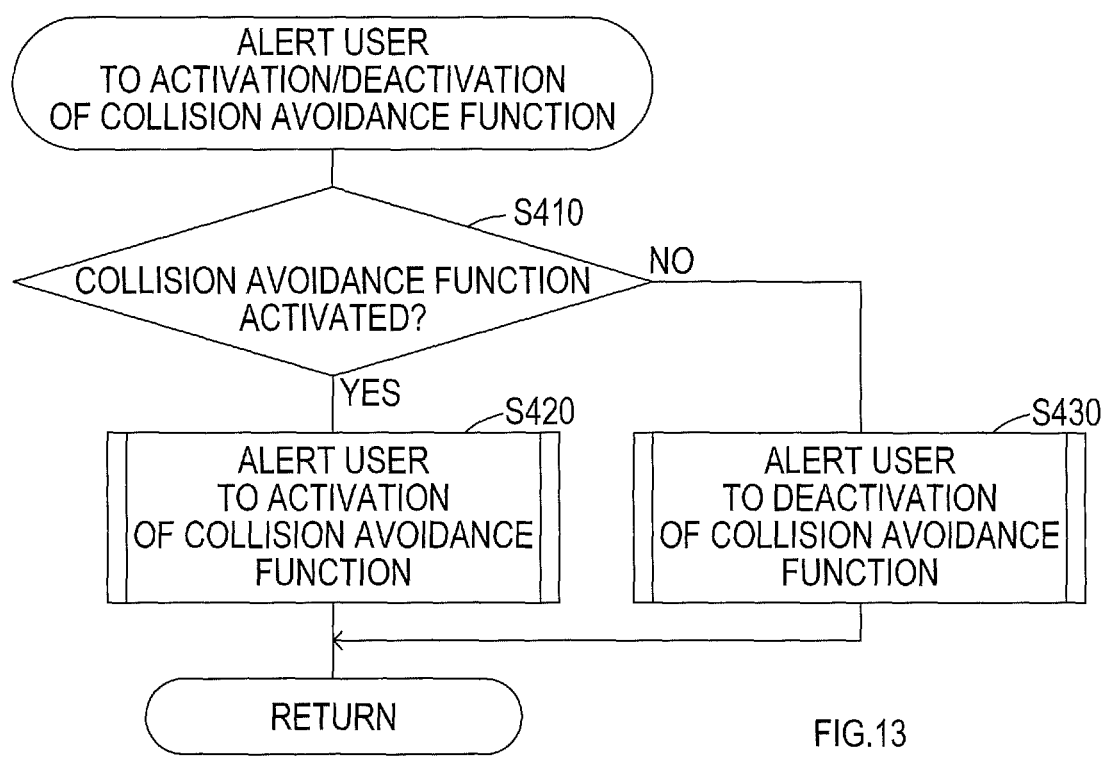
FIG. 13 is a flowchart illustrating an activation/deactivation alerting process for the collision avoidance function executed in an output control process shown in FIG. 7.

With reference to the flowchart of FIG. 13, the activation/deactivation alerting process will be described.

In S410, it is determined whether the collision avoidance function is activated, that is, whether execution of the avoidance control is enabled or disabled. In response to a determination that the collision avoidance function is activated, the process proceeds to S420. In S420, an LED of the collision avoidance indicator 75 is turned on so as to alert the user that the collision avoidance function is activated. Then, the alert process is terminated.

On the other hand, in response to a determination that the collision avoidance function is deactivated, the process proceeds to S430. In S430, the LED of the collision avoidance indicator 75 is turned off so as to alert the user that the collision avoidance function is deactivated. Then, the alert process is terminated.

In the opposite manner to the present embodiment, the LED may be turned on when the collision avoidance function is deactivated, and the LED may be turned off when the collision avoidance function is activated.

Figure 14:
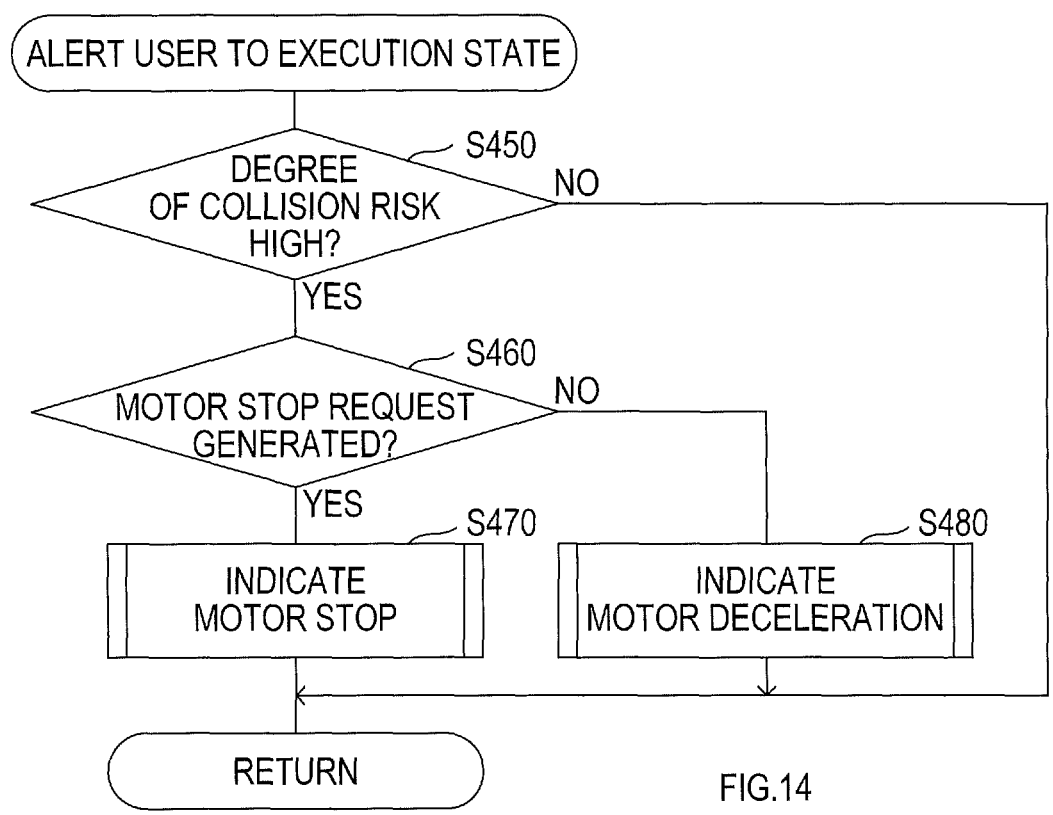
FIG. 14 is a flowchart illustrating an alert process of an execution status of the avoidance control executed in the output control process shown in FIG. 7.

With reference to the flowchart of FIG. 14, the activation/deactivation alerting process will be described. This activation/deactivation alerting process is executed so as to alert the user that the avoidance control for stopping the movement of the push cart 1 is currently executed.

First, in S450, it is determined whether the degree of collision risk calculated in the above-described collision avoidance determination process is higher than the determination value set in advance. In response to a determination that the degree of collision risk is higher than the determination value, the process proceeds to S460. On the other hand, in response to a determination that the degree of collision risk is equal to or smaller than the determination value, the alert process is terminated.

In S460, it is determined whether the stop request for the motor 9 has been generated in the above-described collision avoidance determination process. In response to a determination that the stop request for the motor 9 has been generated, the process proceeds to S470. In S470, the LED of the collision avoidance indicator 75 is flickered in a specified cycle so as to alert the user that the motor 9 will be stopped by execution of the avoidance control. Then, the alert process is terminated.

On the other hand, in response to a determination in S460 that the stop request for the motor 9 has not been generated, the process proceeds to S480. In S480, the LED of the collision avoidance indicator 75 is flickered in a cycle longer than the cycle in S470 so as to alert the user that the motor 9 will be decelerated by execution of the avoidance control. Then, the alert process is terminated.

In other words, in this alarm process, the LED that is turned on when the collision avoidance function is activated is flickered. By changing the cycle of the flickering, the user is alerted that the motor 9 will be stopped or the motor 9 is decelerated.

Accordingly, user can recognize activation/deactivation of the collision avoidance function and the execution status of the avoidance control from the lighting state of the LED of the collision avoidance indicator 75.

When the LED of the collision avoidance indicator 75 flickers in S470 and in S480, the buzzer 68 may produce sound and vibration in accordance with the flickering cycle, for example.

Moreover, in the present embodiment, execution of the avoidance control is alerted by turning on, flickering, and turning off the LED of the collision avoidance indicator 75. Alternatively, a plurality of LEDs may be used for alerting.

While the embodiments of the present disclosure have been described so far, the electrically-assisted push cart according to the present disclosure is not limited to the above-described embodiments and can be carried out in variously modified forms.

(First Modification)

In the enabling/disabling determination process regarding execution of the avoidance control according to the aforementioned embodiment shown in FIG. 10, when the collision avoidance switch 74 is off, execution of the avoidance control is disabled provided that driving of the motor 9 is stopped.

Alternatively, in this determination process, the determination step in S680 may be removed, and execution of the avoidance control may be always disabled whenever the collision avoidance switch 74 is off.

(Second Modification)

Moreover, in the enabling/disabling determination process regarding execution of the avoidance control shown in FIG. 10, when the collision avoidance switch 74 is on, if the moving speed of the push cart 1 is smaller than the specified speed, and if the distance to the obstacle is equal to or smaller than the specified distance, the execution of the avoidance control is disabled.

Alternatively, when the collision avoidance switch 74 is on, execution of the avoidance control may be disabled either if the moving speed of the push cart 1 is smaller than the specified speed, or if the distance to the obstacle is equal to or smaller that the specified distance.

(Third Modification)

In the collision avoidance determination process shown in FIG. 11, in response to a determination in S710 that execution of the avoidance control is enabled, the processes of S720 to S740 are executed.

Figure 15:
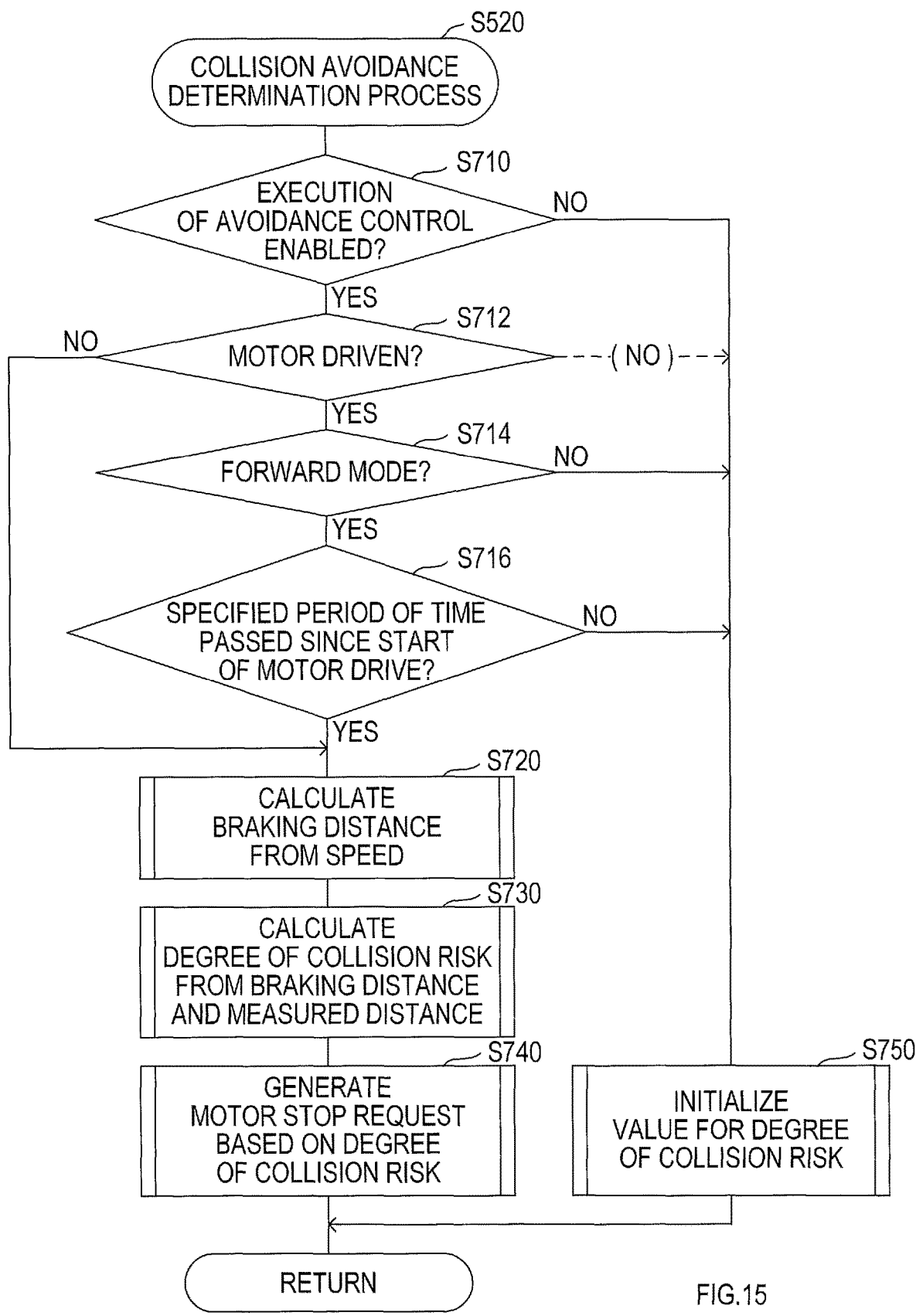
FIG. 15 is a flowchart illustrating a modification of the collision avoidance determination process.

Alternatively, as shown in FIG. 15, in response to a determination in S710 that execution of the avoidance control is enabled, it may be determined in S712 whether the motor 9 is driven. In response to a determination that the motor 9 is not driven, the process may proceed to S720. On the other hand, in response to a determination that the motor 9 is driven, the determination processes in S714 and S716 may be executed.

In S714, it may be determined whether the moving direction of the push cart 1 set by the forward/backward movement changeover switch 94 is forward (in a forward mode). In response to a determination that the forward/backward movement changeover switch 94 is not set to the forward mode (that is, the moving direction is backward), the process may proceed to S750.

On the other hand, in response to a determination in S714 that the moving direction of the push cart 1 is set to the forward mode, the process may proceed to S716. In S716, it may be determined whether a specified period of time has passed since the start of driving of the motor 9. In response to a determination that the specified period of time has passed, the process may proceed to S720. On the other hand, in response to a determination that the specified period of time has not yet passed, the process may proceed to S750.

Due to this configuration, in the case where the push cart 1 is moving in the backward direction, or the specified period of time has not passed since the start of driving the motor 9, the value of the degree of risk is initialized in S750, execution of the avoidance control is disabled, and normal drive control of the motor 9 is executed.

As a result, interruption of the movement of the push cart 1 can be inhibited, for example, in the case where the push cart 1 is moving backward and the user exists in its moving direction, the collision avoidance function is activated interrupting the movement of the push cart 1, or in the case where the push cart 1 is operated in an area where obstacles are often detected, the movement of the push cart 1 is frequently interrupted by the collision avoidance function. Thus, the efficiency of load-carrying work with the push cart 1 can be improved.

In the collision avoidance determination process shown in FIG. 15, in response to a determination S712 that the motor 9 is not driven, the process proceeds to S720. Alternatively, as shown by a dotted line in FIG. 15, the process may proceed to S750, and the value of the degree of collision risk may be initialized.

In this case, when the push cart 1 is manually moved by the user, the value of the degree of collision risk is initialized in S750 so as to disable execution of the avoidance control even if driving of the motor 9 is stopped.

(Fourth Modification)

In the collision avoidance determination process according to the third modification, when execution of the avoidance control is enabled, it is determined whether the motor 9 is driven, whether the moving direction of the push cart 1 is set to the forward mode, and whether the specified period time has passed since the start of driving of the motor 9.

If these conditions are satisfied, the avoidance control is executed in S720 to S740. If these conditions are not satisfied, execution of the avoidance control in S720 to S740 is disabled.

Figure 16:
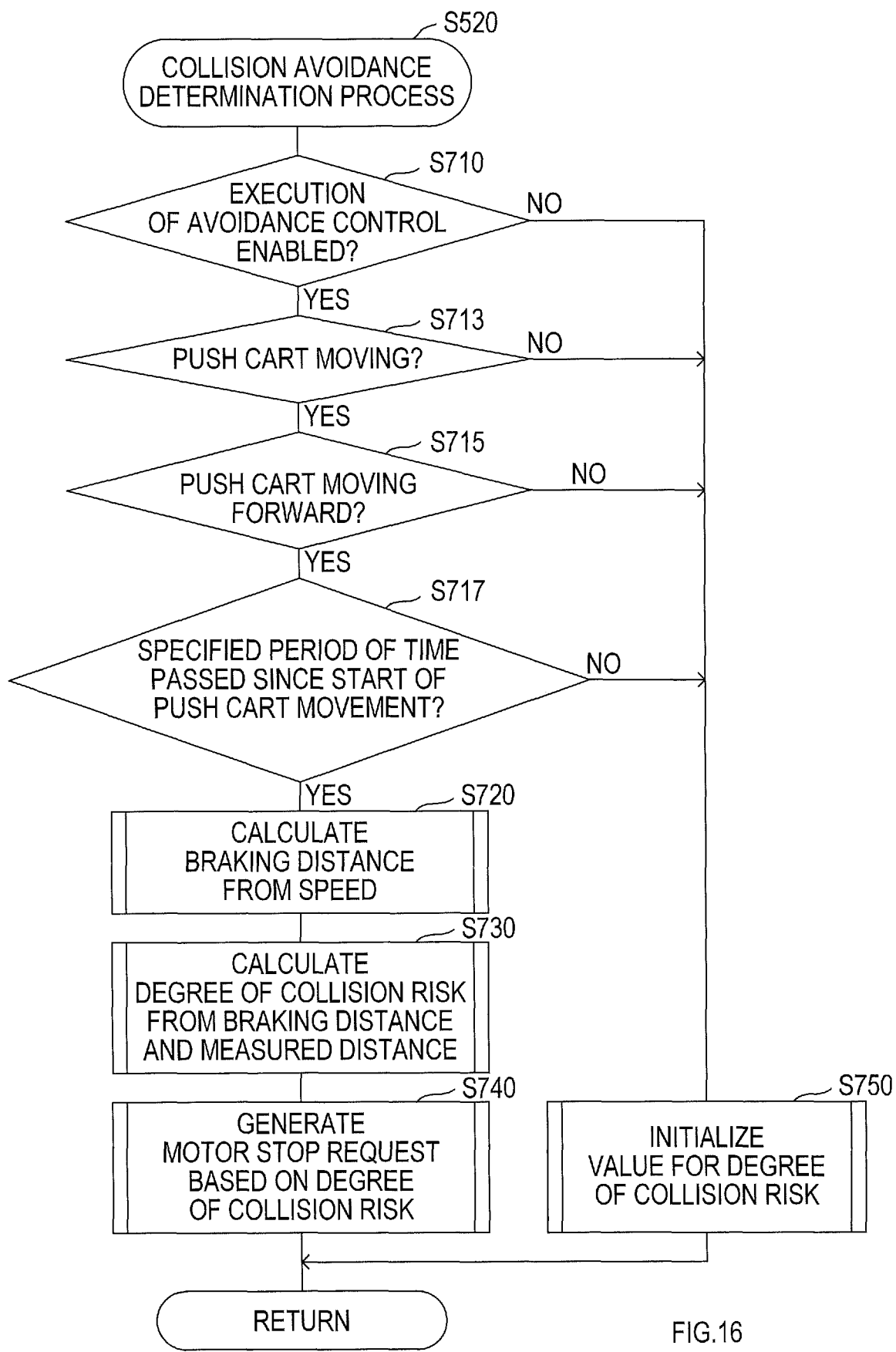
FIG. 16 is a flowchart illustrating another modification of the collision avoidance determination process.

Alternatively, in the fourth embodiment, the collision avoidance determination process may be executed in the order shown in FIG. 16.

In response to a determination in S710 that execution of the avoidance control is enabled, it may be determined in S713 whether the push cart 1 is moving. In response to a determination in S713 that the push cart 1 is moving, the process proceeds to S715 and it may be determined whether the push cart 1 is moving forward.

In response to a determination in S715 that the push cart 1 is moving forward, it may be determined in S717 whether the specified period of time has passed since the start of driving of the push cart 1. In response to a determination S717 that the specified period of time has passed, the process proceeds to S720 and the avoidance control may be executed in S720 to S740.

On the other hand, in response to a negative determinations in S713, S715, and S717, the process proceeds to S750 and execution of the avoidance control may be disabled.

Accordingly, in the case where the collision avoidance determination process is executed in the order shown in FIG. 16, execution the avoidance control is disabled when the push cart 1 is stationary, when the push cart 1 is moving in the backward direction, or when the push cart 1 is moving in the forward direction and the specified period of time has not passed since the start of the movement of the push cart 1. Thus, in the present modification, the same effect as in the above-described the third modification can be also achieved.

(Fifth Modification)

In the motor control process shown in FIG. 12 according to the aforementioned embodiment, in response to a determination that a stop request of the motor 9 has been generated, the motor 9 is stopped in S340 by the braking force generated by the motor 9.

Alternatively, in the fifth embodiment, the brake device 17 may be driven in S340 so as to directly apply the braking force to the front wheel 3, which is the drive wheel, and stop (or decelerate) the movement of the push cart 1.

Figure 17:
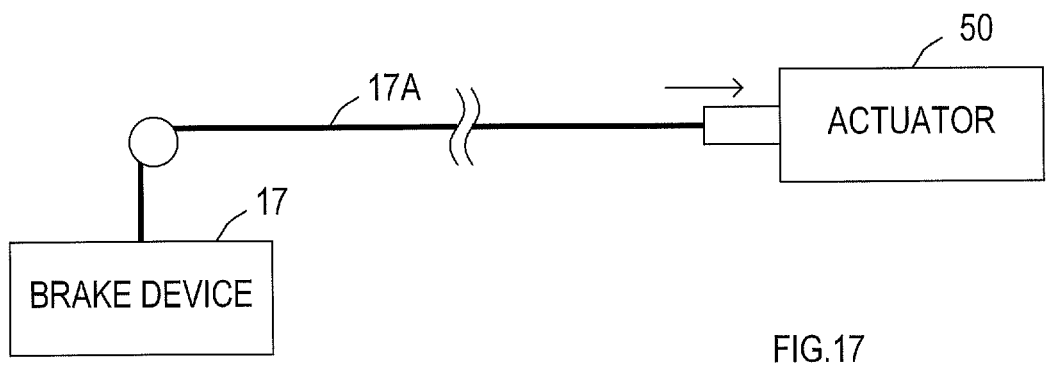
FIG. 17 is a schematic diagram showing an example of a configuration of a driving system that is used to decelerate rotation of a motor by a brake device.

In this case, as shown in FIG. 17, an actuator 50 may be provided for automatically operating the brake device 17. The actuator 50 operates the brake device 17 by pulling a brake wire 17A taken out of the brake device 17, instead of pulling the brake lever 18. That is, by pulling the brake wire 17A, the actuator 50 presses brake pads included in the brake device 17 against the front wheel 3.

In this case, the actuator 50 may be configured to pull the brake wire 17A by a motor or a solenoid. Moreover, the control circuit 81 may be configured to also drive the actuator 50, when the brake lever 18 is pulled, so as to pull the brake wire 17A.

(Other Modifications)

The aforementioned embodiment describes that all the control processes, for example, for detecting obstacles, changing activation and deactivation of the collision avoidance function, and driving the motor 9 are executed by the control circuit 81. Alternatively, for example, another control circuit (microcomputer) that is different from the control circuit (microcomputer) that controls to drive the motor 9 may be configured to execute the control processes for detecting obstacles, or for detecting obstacles and determining whether the collision avoidance function is activated or deactivated.

The configuration and the operation of the electrically-assisted push cart according to the aforementioned embodiment is merely one example. The present disclosure can be employed in various electrically-assisted push carts with motor-driven wheels in the same manner as in the aforementioned embodiment. For example, the electrically-assisted push cart may include one, two, four or more wheels. The motor of the electrically-assisted push cart only needs to be configured to drive a wheel. The motor may be configured to drive a plurality of wheels.

A plurality of functions performed by one element in the above-described embodiments may be performed by a plurality of elements, and one function performed by one element may be performed by a plurality of elements. A plurality of functions performed by a plurality of elements may be performed by one element, and one function performed by a plurality of elements may be performed by one element. Part of the configuration of the above-described embodiments may be omitted. At least part of the configuration of the above-described embodiments may be added to or replaced with the configuration of other embodiments described above. Any modes within the scope of the technical ideas identified from the claim language are embodiments of the present disclosure.

What is claimed is:

1. A push cart comprising:
a wheel;
a motor configured to generate a rotational force that rotates the wheel;
an obstacle detector configured to detect an obstacle that interrupts a movement of the push cart; and
a controller configured to execute, in response to detection of the obstacle by the obstacle detector, avoidance control to control driving of the motor such that the movement of the push cart is limited, the controller being configured to disable execution of the avoidance control in response to a determination that a specified disabling condition is satisfied,
wherein the obstacle detector is configured to detect a distance to the obstacle, and
wherein the disabling condition includes determining that the distance to the obstacle detected by the obstacle detector is equal to or smaller than a specified distance.

2. The push cart according to claim 1,
wherein the disabling condition includes determining that a moving speed of the push cart is equal to or smaller than a specified speed.

3. The push cart according to claim 1,
wherein the controller is configured to determine that the disabling condition is satisfied during a backward movement of the push cart.

4. The push cart according to claim 1,
wherein the controller is configured to determine that the disabling condition is satisfied while the push cart is stationary.

5. The push cart according to claim 1,
wherein the motor is configured to generate a braking force that decelerates rotation of the wheel, and
wherein the controller is configured to control driving of the motor such that the braking force is generated in the avoidance control.

6. The push cart according to claim 5,
wherein the controller is configured to control driving of the motor in the avoidance control such that, in response to a distance to the obstacle being shorter than a specified distance, the braking force is generated that is larger than a braking force generated in response to the distance being longer than the specified distance.

7. The push cart according to claim 1, further comprising:
a brake device configured to directly limit rotation of the wheel,
wherein the controller is configured to drive the brake device in the avoidance control.

8. The push cart according to claim 1, further comprising:
a collision avoidance switch configured to command the controller to enable or disable execution of the avoidance control.

9. The push cart according to claim 8,
wherein the controller is configured to allow execution of the avoidance control while the push cart is moving despite the controller being commanded by the collision avoidance switch to disable execution of the avoidance control.

10. The push cart according to claim 8, further comprising:
an execution alarm device configured to alert the user that execution of the avoidance control by the controller is enabled or disabled.

11. The push cart according to claim 1, further comprising:
a movement alarm device configured to alert the user that the controller is executing the avoidance control and limiting the movement of the push cart.

12. A push cart comprising:
a wheel;
a motor configured to generate a rotational force that rotates the wheel;
an obstacle detector configured to detect an obstacle that interrupts a movement of the push cart; and
a controller configured to execute, in response to detection of the obstacle by the obstacle detector, avoidance control to control driving of the motor such that the movement of the push cart is limited, the controller being configured to disable execution of the avoidance control in response to a determination that a specified disabling condition is satisfied,
wherein the controller is configured to determine that the disabling condition is satisfied for a specified period of time since a start of driving of the motor.

13. A push cart comprising:
a wheel;
a motor configured to generate a rotational force that rotates the wheel;
an obstacle detector configured to detect an obstacle that interrupts a movement of the push cart; and
a controller configured to execute, in response to detection of the obstacle by the obstacle detector, avoidance control to control driving of the motor such that the movement of the push cart is limited, the controller being configured to disable execution of the avoidance control in response to a determination that a specified disabling condition is satisfied,
wherein the controller is configured to determine that the disabling condition is satisfied for a specified period of time since a start of the movement of the push cart.

14. A push cart comprising:
a wheel;
a motor configured to generate a rotational force that rotates the wheel;
an obstacle detector configured to detect an obstacle that interrupts a movement of the push cart; and
a controller configured to execute, in response to detection of the obstacle by the obstacle detector, avoidance control to control driving of the motor such that the movement of the push cart is limited, the controller being configured to disable execution of the avoidance control in response to a determination that a specified disabling condition is satisfied,
wherein the controller is configured to determine that the disabling condition is satisfied for a specified period of time since a start of a forward movement of the push cart.

15. A push cart comprising:
a wheel;
a motor configured to generate a rotational force that rotates the wheel;
an obstacle detector configured to detect an obstacle that interrupts a movement of the push cart; and
a controller configured to execute, in response to detection of the obstacle by the obstacle detector, avoidance control to control driving of the motor such that the movement of the push cart is limited, the controller being configured to disable execution of the avoidance control in response to a determination that a specified disabling condition is satisfied,
wherein the controller is configured to determine that the disabling condition is satisfied while driving of the motor is stopped.

16. A push cart comprising
a wheel;
a motor configured to generate a rotational force that rotates the wheel;
an obstacle detector configured to detect an obstacle that interrupts a movement of the push cart;
a controller configured to execute, in response to detection of the obstacle by the obstacle detector, avoidance control to control driving of the motor such that the movement of the push cart is limited, the controller being configured to disable execution of the avoidance control in response to a determination that a specified disabling condition is satisfied; and
a collision avoidance switch configured to command the controller to enable or disable execution of the avoidance control,
wherein the controller is configured to allow execution of the avoidance control while the motor is driven despite the controller being commanded by the collision avoidance switch to disable execution of the avoidance control.

* * * * *